United States Patent
Nishida

(10) Patent No.: US 8,947,742 B2
(45) Date of Patent: Feb. 3, 2015

(54) IMAGE FORMING APPARATUS FOR INCREASING COMBINED-COLOR REPRODUCTION ACCURACY FOR SUPERIMPOSED COLORS

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 40 days.

(21) Appl. No.: 13/996,392

(22) PCT Filed: Jan. 25, 2012

(86) PCT No.: PCT/JP2012/052202
§ 371 (c)(1), (2), (4) Date: Jun. 20, 2013

(87) PCT Pub. No.: WO2012/108304
PCT Pub. Date: Aug. 16, 2012

(65) Prior Publication Data
US 2013/0286442 A1    Oct. 31, 2013

(30) Foreign Application Priority Data
Feb. 9, 2011 (JP) ................................ 2011-025649

(51) Int. Cl.
*G06T 5/00* (2006.01)
*G06K 15/02* (2006.01)
(Continued)

(52) U.S. Cl.
CPC ........ *G06K 15/1878* (2013.01); *G03G 15/0189* (2013.01); *G03G 15/5062* (2013.01); *H04N 1/6047* (2013.01); *G03G 2215/0132* (2013.01); *G03G 2215/0193* (2013.01)
USPC ........................................................ 358/3.27

(58) Field of Classification Search
CPC .......... G06K 15/1878; G03G 15/0189; G03G 15/5062; G03G 2215/0132; G03G 215/0193; H04N 1/6047
See application file for complete search history.

(56) References Cited

U.S. PATENT DOCUMENTS

| 5,619,427 A | 4/1997 | Okubo |
| 6,075,614 A | 6/2000 | Ohtsuka et al. |

(Continued)

FOREIGN PATENT DOCUMENTS

| JP | 09-009086 | 1/1997 |
| JP | 09-248937 | 9/1997 |

(Continued)

OTHER PUBLICATIONS

International Search Report Issued Mar. 13, 2012 in PCT/JP2012/052202 Filed on Jan. 25, 2012.

*Primary Examiner* — Benny Q Tieu
*Assistant Examiner* — Sunil Chacko
(74) *Attorney, Agent, or Firm* — Harness, Dickey & Pierce, P.L.C.

(57) ABSTRACT

A control device mounted in an image forming apparatus includes a region searching for unit searching for a region adapted to measure colors in an image; a color measurement unit configured to measure colors of the superimposed color toner image in the region; a storage unit storing measured colors and densities proportional to area ratios of primary color toner images in the superimposed color toner image in the region; and a correction amount determination unit determine correction amounts corresponding to the setting values expressing the tone reproduction curves to minimize the difference between the measured colors and the reference colors.

3 Claims, 11 Drawing Sheets

(51) Int. Cl.
*G03G 15/01* (2006.01)
*G03G 15/00* (2006.01)
*H04N 1/60* (2006.01)

(56) References Cited

U.S. PATENT DOCUMENTS

| | | |
|---|---|---|
| 6,278,533 B1 | 8/2001 | Takemoto |
| 6,975,949 B2 | 12/2005 | Mestha et al. |
| 7,307,752 B1 | 12/2007 | Mestha et al. |
| 2003/0053085 A1 | 3/2003 | Takemoto |
| 2004/0141193 A1 | 7/2004 | Mestha |
| 2008/0025738 A1* | 1/2008 | Ahn et al. .................. 399/27 |
| 2011/0279834 A1 | 11/2011 | Nishida |
| 2012/0050760 A1 | 3/2012 | Nishida |

FOREIGN PATENT DOCUMENTS

| | | |
|---|---|---|
| JP | 10-164352 | 6/1998 |
| JP | 2002-033935 | 1/2002 |
| JP | 2004-229294 | 8/2004 |
| JP | 2005-315883 | 11/2005 |
| JP | 2009-071617 | 4/2009 |
| JP | 2010-189881 | 9/2010 |
| JP | 2012-070360 | 4/2012 |

* cited by examiner

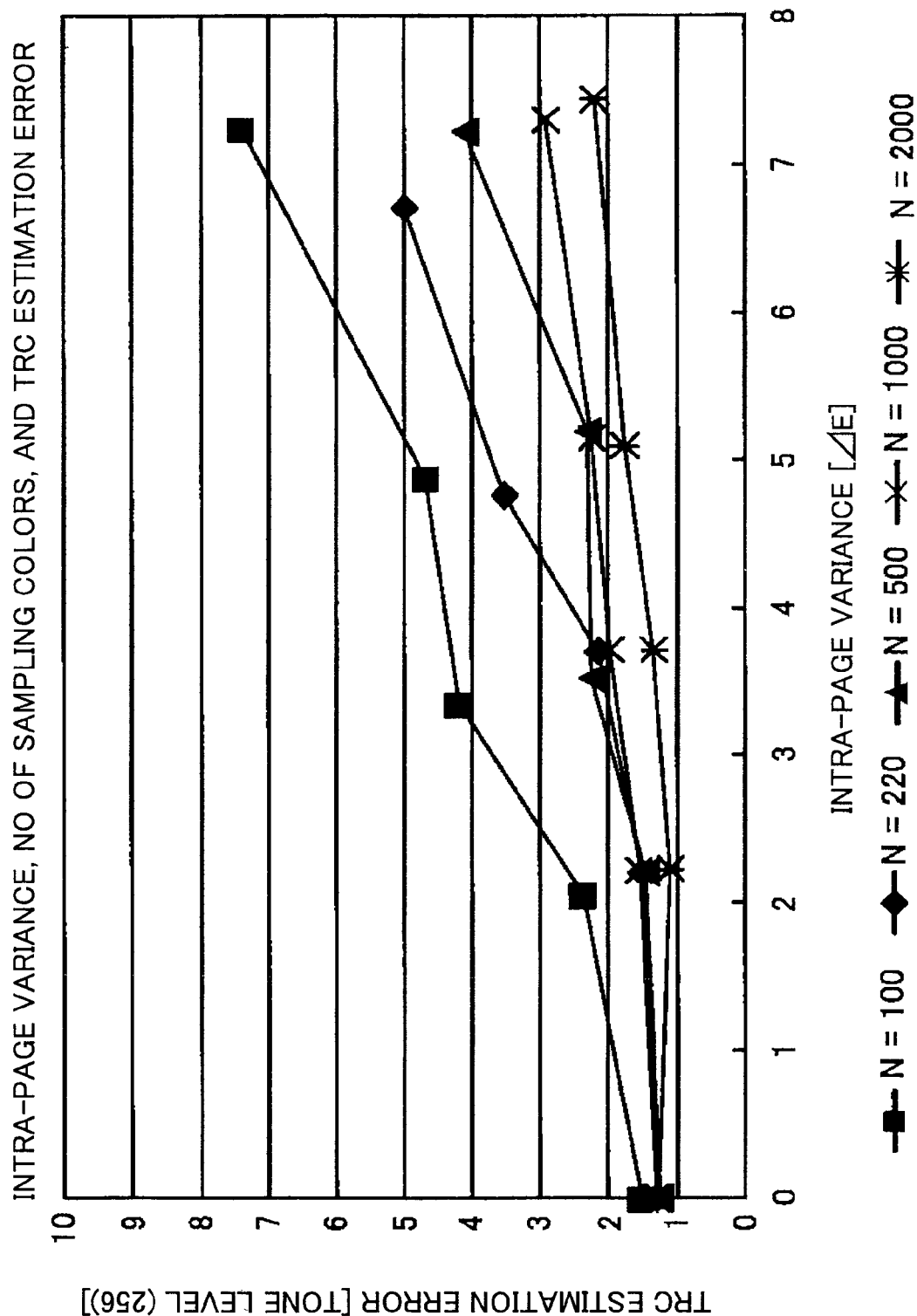

IMAGE FORMING APPARATUS FOR INCREASING COMBINED-COLOR REPRODUCTION ACCURACY FOR SUPERIMPOSED COLORS

TECHNICAL FIELD

The present invention relates to an image forming apparatus including a copier, a facsimile machine, a printer and the like, and a control device and a control method used in the image forming apparatus.

BACKGROUND ART

In an image forming apparatus forming a toner image using an electrophotographic method, when an environmental condition such as temperature and humidity changes or when a continuous printing operation is performed for a long time period, a toner adhesion amount relative to a toner image per unit area may change, so that the image density varies. In a color image forming apparatus forming a color image, when the toner adhesion amounts of plural primary colors fluctuate (change), the color tone of the corresponding superimposed color (e.g., a combination of the L* value, the a* value, and the b* value in the L*a*b* color coordinate system) may be disturbed (influenced). Specifically, the color(s) reproduced in a color image forming apparatus is roughly classified into the primary color and the superimposed color. The primary color refers to a color that is expressed by using a single kind of toner. For example, in a configuration where there are four kinds of colors which are yellow (Y), magenta (M), cyan (C), and black (K), the color expressed by using only any one of the Y, M, C, and K toners is the primary color. On the other hand, the superimposed color refers to a color which is expressed by using two or more primary colors. Namely, the superimposed color is reproduced by superimposing plural primary colors. Therefore, when the toner adhesion amounts of the corresponding primary colors fluctuate (change), the color tone of the corresponding superimposed color reproduced by superimposing the primary colors may be disturbed (influenced).

Therefore, Patent Document 1 describes a color marking device that calibrates color adjustment by outputting a test pattern of the superimposed colors and multiple tones on a test print sheet and estimating the density based on the data of the reflectance of the test print sheet, so as to control the image processing conditions of the image density and the like. Namely, specifically, plural test patterns for the calibration to determine an image forming parameter, specifically a tone reproduction curve, are formed on a test print sheet besides the print sheets on which the images based on the user's instructions are formed. Then, the L* value, the a* value, and the b* value of the color references of the test patterns are detected, and based on the detected result, the tone reproduction curve is corrected. After that, based on the corrected tone reproduction curve, the color toner image of the superimposed colors and multiple tones is formed. By doing this, when a state of the image forming process is changed, the fluctuation of the colors output on the sheets may be controlled, and stable image quality may be obtained.

On the other hand, recently, there have been developed color production printers that quickly output a larger amount of color documents such as flyers, catalogs, reports, bills and the like. Such color production printers are typically used so that, for example, tens of millions of telephone bills and receipts are issued within one week or so. In this case, the printing is continuously performed during all day and night in a period such as one week. In other words, hundreds of sheets per minute are continuously printed for tens of hours. Due to this requirement, the color production printers have the characteristic (requirement) that it is absolutely not possible to stop the apparatus during the continuous operation. This is because, by stopping the apparatus, the necessary large amount of sheets may not be printed before the due date of issue. In this regard, the fast-printing type color production printers are technically much different from the printers (MPFs: Multifunction Peripherals) that may be installed in offices.

When the method of controlling setting values representing the tone reproduction curve of the image processing parameter described in Patent Document 1 is used, besides the print sheets on which images based on the user's instructions are output (printed), it is necessary to additionally print (discharge) the test print sheet on which the test patterns described above are output. Therefore, the user has to separate the test print sheet from the print sheets. This separating operation is an extremely troublesome task for the user. Therefore, it may not be practical to employ such a configuration to output the test toner image. Accordingly, it may not be possible to frequently perform the control of setting values representing the tone reproduction curve as described in Patent Document 1. Especially, in the case where hundreds of sheets per minute are quickly and continuously printed for tens of hours as the fast type color production printers described above, it may become necessary to stop printing every several minutes to control the setting values representing the tone reproduction curve. As described above, this is contrary to the characteristic of the fast type color production printer that it is absolutely not possible to stop the apparatus during the continuous operation. Further, when the sheets are continuous printed without performing the control of the setting values representing the tone reproduction curve, the state of the process may be largely changed, and the image quality may be degraded. Namely, regarding the fast type color production printer, a new configuration may be necessary that always performs the control of the setting values representing the tone reproduction curve in real time without stopping the printing operation.

[Patent Document 1] Japanese Laid-Open Patent Application No. 2002-033935

[Patent Document 2] Japanese Laid-Open Patent Application No. 2004-229294

DISCLOSURE OF THE INVENTION

Problems to be Solved by the Invention

However, according to Patent Documents 1 and 2, it is necessary to form the test pattern on the test print sheet. Therefore, to reduce the downtime of the apparatus due to the control of setting values representing the tone reproduction curve, it may be necessary to make the cycle of forming the test pattern longer. On the other hand, to obtain the stable image quality, it may be necessary to frequently perform the control of the setting values representing the tone reproduction curve. This trade off may not be avoided as long as the test pattern is required to be printed on the test print sheet.

To resolve the problem, in Japanese Patent Application No. 2010-189881 (hereinafter referred to as "prior application"), the inventors of the present invention proposed a control device that determines the correction amount of the setting values representing the tone reproduction curve of the image processing parameter to reduce the difference based on the algorithm representing the relationship between the output colors and the setting values representing the tone reproduction curve of the image processing parameter. The output colors are stored in advance with respect to plural superimposed toner images formed by an image forming unit by searching for a color measurement adaptive region adapted to measure colors from image information based on the user's instructions without using the test print sheet on which the test pattern is output, and based on the difference between the measured color results and original colors. The measured color results are obtained by measuring colors of the color measurement adaptive region of the plural superimposed toner images formed based on the image information. In the control device according to the prior application, it may become possible to accurately reproduce the superimposed colors without forcing the user to separate the test print sheets.

However, unlike the test pattern, the color density distribution in the image information output based on the user may often be biased. Namely, the test pattern evenly includes colors from a high-density color to a low-density color. On the other hand, the color density distribution of the image information output based on the user's instructions may not evenly include colors from the high-density color to the low-density color. Further, the color density distributions may often vary among plural image information outputs based on the user's instructions. In the prior application, the correction amount of the setting values representing the tone reproduction curve of the image processing parameter is determined so as to reduce the difference between the measured color results and the original colors, the measured color results being obtained by measuring colors of the color measurement adaptive region searched for in a single image information output based on the user's instructions. Therefore, the setting values representing the tone reproduction curve of the actual image processing parameters are corrected based on the image information where the color density distribution is biased. The corrected actual tone reproduction curve may include the biased color density distribution, so that smoothness of the actual tone reproduction curve may be lost. As a result, recognizable tone discontinuity may be observed in the image formed based on the corrected actual tone reproduction curve.

The measured color results may further be influenced by intra-page variance due to the eccentricity of the photoconductor drum and a measurement error of the sensor. When the actual tone reproduction curve is corrected based on the measured color results including the intra-page variance and the measurement error of the sensor, there may be difference between the corrected actual tone reproduction curve and the ideal tone reproduction curve. The difference may vary depending on the amounts of the intra-page variance and the measurement error of the sensor. Therefore, the amounts of the intra-page variance and/or the measurement error of the sensor suddenly change, recognizable color variation may be observed in the image output (formed) based on the corrected actual tone reproduction curve.

The present invention is made in light of the above problem. An object of the present invention is to provide an image forming apparatus and a control device and a control method used in the image forming apparatus, the image forming apparatus being capable of accurately reproducing superimposed colors and maintaining the smoothness of the tone reproduction curve and controlling the sudden change of the tone reproduction curve without forcing the user to separate the test print sheets.

Means for Solving the Problems

To that end, according to a first aspect of the present invention, a control device mounted in an image forming apparatus that includes an image forming unit forming plural primary color toner images different from each other on a surface of a single latent image carrier or forming plural primary color toner images different from each other on corresponding plural latent image carriers, an image information processing unit processing image information to be input to the image forming unit based on setting values expressing tone reproduction curves which are image processing parameters forming the plural primary color toner images different from each other, and a transfer unit acquiring a superimposed color toner image by forming a transfer nip section by contacting a contact member to the surface of the single latent image carrier or each surface of the plural latent image carriers, superimposing and transferring the plural primary color toner images formed on the single latent image carrier or the plural primary color toner images different from each other formed on the corresponding plural latent image carriers onto a surface of the contact member or a recording sheet held to the surface of the contact member, and executing control to drive the imaging forming unit and the transfer unit and a predetermined calculation process. The control device includes a region searching for unit performing a region searching for process to search for plural color measurement adaptive regions adapted to measure colors in an image indicated by the image information; a color measurement unit measuring colors of the plural color measurement adaptive regions of the superimposed color toner image formed based on the image information; a storage unit storing measured colors which are color measurement results of measuring colors of the plural color measurement adaptive regions of the superimposed color toner image formed based on the image information and densities proportional to area ratios of primary color toner images in the superimposed color toner image in the plural color measurement adaptive regions with respect to each of image information; an averaging unit averaging the measured colors and the densities stored in the storage unit; a correction amount determination unit, after the region searching for process is performed, based on plural algorithms representing relationships between output colors previously stored with respect to each of plural primary color images formed by the image forming unit (image information processing unit) and the setting values expressing the tone reproduction curves of the image forming unit, the densities averaged by the averaging unit, difference between the measured colors averaged by the averaging unit and the reference (output) colors, and current setting values expressing the tone reproduction curves, determining correction amounts corresponding to the setting values expressing the tone reproduction curves to minimize the difference; and a correction unit correcting the setting values expressing the tone reproduction curves based on the correction amounts.

Further, according to a second aspect of the present invention, an image forming apparatus includes an image forming unit forming plural primary color toner images different from each other on a surface of a single latent image carrier or plural primary color toner images different from each other on corresponding plural latent image carriers; an image information processing unit processing image information to be input to the image forming unit based on setting values expressing tone reproduction curves which are image processing parameters forming the plural primary color toner images different from each other; a transfer unit acquiring a superimposed color toner image by forming a transfer nip section by contacting a contact member to the surface of the single latent image carrier or each surface of the plural latent image carriers, and superimpose and transfer the plural primary color toner images formed on the single latent image carrier or the plural primary color toner images different from each other formed on the corresponding plural latent image carriers onto a surface of the contact member or a recording sheet held to the surface of the contact member; a control unit executing control to drive the imaging forming unit and the transfer unit and a predetermined calculation process; and a color measurement unit measuring colors of the superimposed color toner image formed based on the image information. Further, as the control unit, the control device according to the first aspect is used.

According an embodiment of the present invention, instead of forming an image for the test print sheet to measure colors and measuring the colors, the color measurement adaptive region adapted to measure colors with respect to the image output based on the user's instructions is searched for. The colors of the searched-for color measurement adaptive region of the superimposed color toner image are measured, and the measured colors which are the results of the color measurement for each of the image information and the densities for each of the image information are stored into the storage unit. Then, the densities and measured colors stored in the storage unit are averaged. Then, plural algorithms represent relationships between the output colors stored in advance and the setting values expressing the tone reproduction curves of the image information processing unit (image forming unit) with respect to the plural primary toner images formed by the image forming unit. Based on the algorithms, averaged densities, difference between averaged measured colors and reference colors (output colors), and setting values expressing the tone reproduction curves, the correction amounts corresponding to the setting values expressing the tone reproduction curves to reduce the difference are determined. By doing this, without forming a test toner image to measure the colors of actually output superimposed colors, based on the results of the color measurement of the color measurement adaptive region of the image formed based on the user's instructions, appropriate correction amounts corresponding to the setting values expressing the tone reproduction curves are determined. Based on the determined correction amounts, the setting values expressing the tone reproduction curves are corrected. By doing this, without forming a test image, by appropriately correcting the setting values expressing the tone reproduction curves, it may become possible to accurately reproduce the colors without forcing the user to separate the test print sheet on which a test image is output.

Further, by correcting the biased density distribution of the colors in each of the image information by averaging the densities proportional to the area ratios and measured colors of the color measurement adaptive regions stored in the storage unit, the smoothness of the corrected tone reproduction curves may not be lost even when the image information in which the density distribution of the color is biased. Further, by averaging the influences of the intra-page variance and the measurement error due to the eccentricity of the photoconductor drum, those influences may be reduced. By dong this, it may become possible to maintain the smoothness of the tone reproduction curve and prevent sudden variance of the tone reproduction curve. Further, it may become possible to prevent the occurrence of recognizable tone discontinuity and recognizable color variance.

Effects of the Present Invention

According to an embodiment of the present invention, it may become possible to obtain excellent effects of accurately reproducing superimposed colors and maintaining the smoothness of the tone reproduction curve and controlling the sudden change of the tone reproduction curve without forcing the user to separate the test print sheet.

BRIEF DESCRIPTION OF THE DRAWINGS

FIG. 12 is a characteristic diagram illustrating relationships between intra-surface variation and tone reproduction curve estimation error.

DESCRIPTION OF THE REFERENCE NUMERALS

100: PRINTER
109: SPECTROMETER
401: A/D CONVERTER CIRCUIT
402: CPU
403: RAM
404: PARAMETER SETTING SECTION
405: ROM
406: MAIN BODY CONTROL SECTION
406a: MEASURED VALUE ACQUISITION SECTION
406b: CORRECTION AMOUNT DETERMINATION SECTION
406c: ALGORITHM CALCULATION SECTION
406d: REGION SEARCHING FOR SECTION
406e: PARAMETER SETTING SECTION
406f: RGB/L*a*b* CONVERSION SECTION
406g: SAMPLING COLOR DATABASE
410: PRINT CONTROLLER
410a: 3D-LUT
410b: UCR/GCR
410c: TRC STORAGE SECTION
410d: INTERMEDIATE TONE PROCESSING SECTION
411: PC
412: SCANNER
413: FAX
414: DRIVING CIRCUIT

415: MOTOR/CLUTCH
416: HIGH VOLTAGE GENERATING DEVICE
417: TEMPERATURE HUMIDITY SENSOR
418: TONER DENSITY SENSOR

BEST MODE FOR CARRYING OUT THE INVENTION

In the following, an image forming apparatus according to an embodiment of the present invention is described.

First, a fundamental configuration of the image forming apparatus in this embodiment is described. Typically, the image forming apparatus in this embodiment may be a color production printer that realizes color on-demand printing to quickly output a large amount of color documents such as bills. In such a color production printer, for example, tens of millions of telephone bills and receipts are issued within one week or so. To that end, the printing is continuously conducted during all day and night in a period such as one week. In other words, hundreds of sheets per minute are continuously printed for tens of hours.

Figure 1:
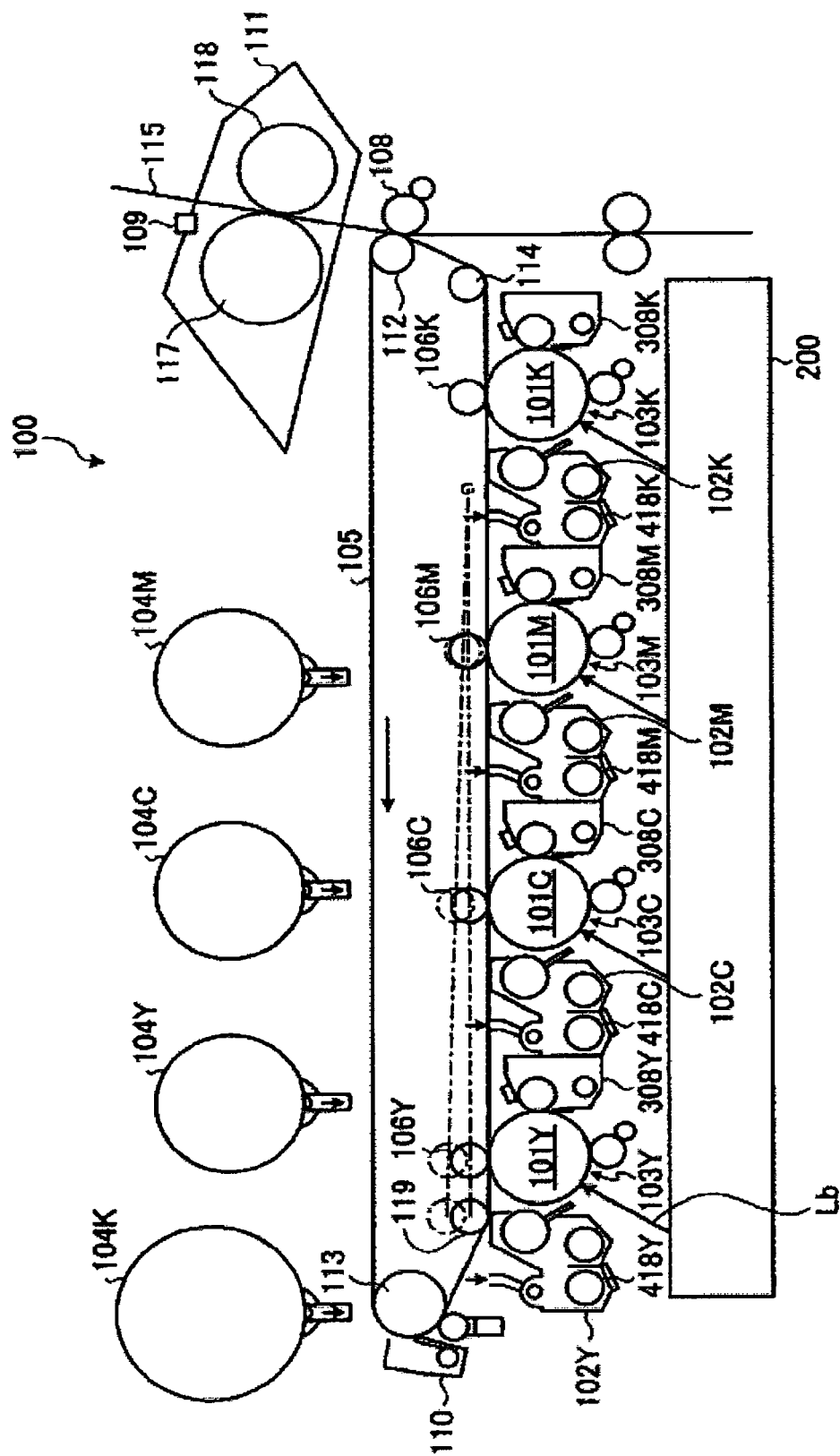
FIG. 1 is a schematic diagram illustrating a main part of a printer according to an embodiment.

FIG. 1 is a schematic drawing illustrating a main part of the color production printer according to an embodiment. In FIG. 1, it is noted that only a part where an image forming process conducting the exposure, the charging, the development, the transfer, and the fixing (i.e., a process engine part) using the electrophotographic method from among the entire processes of a color projection printer 100 (hereinafter simplified as the "printer 100") is illustrated. Besides the elements illustrated in FIG. 1, the printer 100 further includes a sheet feeding device (not shown) to supply a recording sheet 115 as a recording material, a manual tray (not shown) to manually supply the recording sheet 115, and a discharge tray (not shown) to discharge the recording sheet 115 on which an image is formed.

The printer 100 further includes an intermediate transfer belt 105 having an endless belt shape as an intermediate transfer body. The intermediate transfer belt 105 is stretched by four supporting rollers 112, 113, 114, and 119, and is driven to endlessly move in the counterclockwise direction in the figure by the rotation of the supporting roller 112 having a driving roller function.

Along an extending part of the intermediate transfer belt 105, there are provided (arranged) four image forming units 103Y, 103C, 103M, and 103K corresponding yellow (Y), cyan (C), magenta (M), and black (K). The configurations of the image forming units 103Y, 103C, 103M, and 103K are substantially the same as each other except that the colors of the toners are different from each other. Herein, the suffixes Y, C, M, and K are used for the members or the devices using the yellow (Y), cyan (C), magenta (M), and black (K) colors, respectively.

The image forming units 103Y, 103C, 103M, and 103K include corresponding photosensitive bodies 101Y, 101C, 101M, and 101K, each having a drum shape; development devices 102Y, 102C, 102M, and 102K; and charging devices to uniformly charge the corresponding photosensitive bodies. Inside the loop of the intermediate transfer belt 105, there are primary transfer rollers 106y, 106C, 106M, and 106K at the positions facing the photosensitive bodies 101Y, 101C, 101M, and 101K, respectively, so that the primary transfer rollers 106y, 106C, 106 M, and 106K push (downward) the intermediate transfer belt 105 toward the photosensitive bodies 101Y, 101C, 101M, and 101K. By doing this, primary transfer nip sections where the photosensitive bodies 101Y, 101C, 101M, and 101K are in contact with the intermediate transfer belt 105 for yellow (Y), cyan (C), magenta (M), and black (K) colors, respectively, are formed.

On the upper side of the intermediate transfer belt 105, there are provided toner bottles 104Y, 104C, 104M, and 104K containing toners for yellow (Y), cyan (C), magenta (M), and black (K) colors, respectively (hereinafter may be simplified as Y toner, C toner, M toner, and K toner).

The charging devices of the image forming units 103Y, 103C, 103M, and 103K uniformly charge the surfaces of the photosensitive bodies 101Y, 101C, 101M, and 101K so as to be charged with the same polarity as the charge polarity of the toners. As the charging devices, FIG. 1 illustrates a case where charged brush rollers to which a charge bias is applied are in contact with or approach the photosensitive bodies 101Y, 101C, 101M, and 101K. However, any charging devices having other configuration such as scorotron chargers may be used.

Under the image forming units 103Y, 103C, 103M, and 103K, there is provided a latent image writing unit 200. The latent image writing unit 200 emits writing lights Lb for yellow (Y), cyan (C), magenta (M), and black (K) colors by driving corresponding semiconductor lasers (not shown), and deflects the writing lights Lb in the main scanning direction by using corresponding polygon mirrors, so as to optically scan the photosensitive bodies 101Y, 101C, 101M, and 101K which serve as latent image carriers. By doing this, electrostatic latent images of yellow (Y), cyan (C), magenta (M), and black (K) colors are written (formed) on the surfaces of the photosensitive bodies 101Y, 101C, 101M, and 101K, respectively, which have been uniformly charged. In this case, the light source is not limited to the semiconductor laser. For example, an LED (Light Emitting Diode) may be used.

Figure 2:
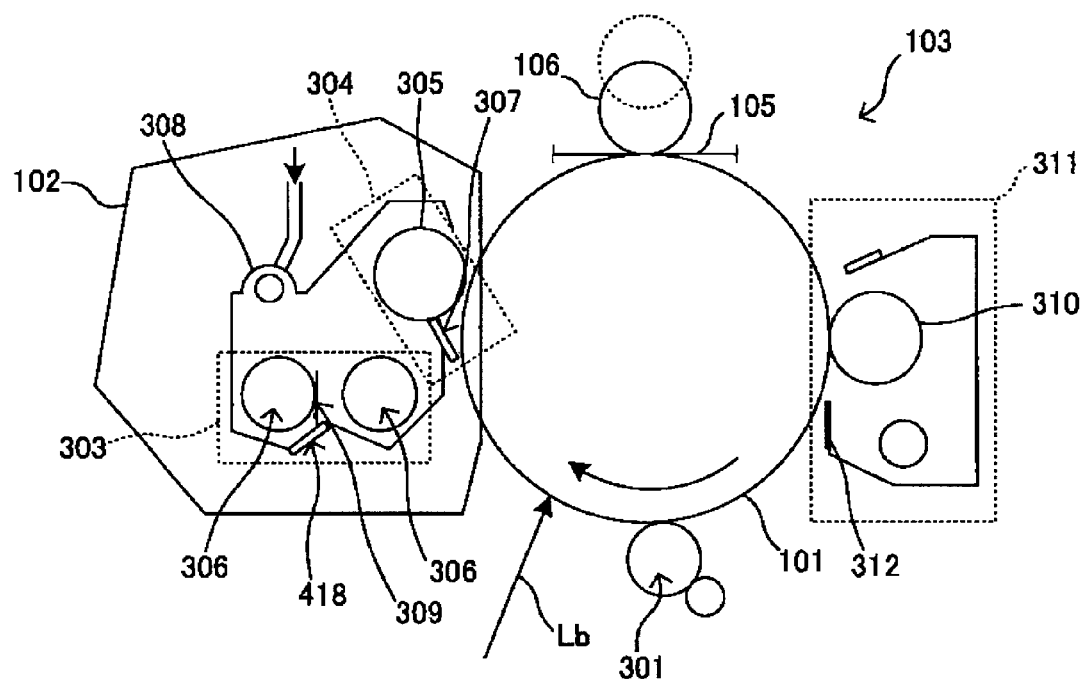
FIG. 2 is an enlarged view illustrating an image forming unit of the printer of the embodiment.

In the following, a configuration of the image forming units 103Y, 103C, 103M, and 103K is described with reference to FIG. 2. As described above, the configurations of the image forming units 103Y, 103C, 103M, and 103K are substantially the same as each other except that the colors of the toners are different from each other. Therefore, FIG. 2 illustrates only any one of the four image forming units. Namely, the configuration in FIG. 2 is not limited to a unit for a specific color. This is why suffixes (Y, C, M, and K) of the numerals are omitted. Also, in the following descriptions, the suffixes (Y, C, M, and K) of the numerals may be omitted.

The image forming unit 103 includes a charging device 301 charging the photosensitive body 101, the development device 102, a photosensitive body cleaning device 311 and the like around the photosensitive body 101. Inside the loop of the intermediate transfer belt 105, there is provided the primary transfer roller 106 at the position facing the photosensitive body 101 via the intermediate transfer belt 105. However, in place of the primary transfer roller 106, for example, an electrically conductive member having a brush shape or a non-contact type corona charger may be used.

The charging device 301 employs a contact-type charging method using a charging roller, and is in contact with the photosensitive body 101 to apply a voltage so as to uniformly charge the surface of the photosensitive body 101. As the charging device 301, for example, a device employing a non-contact-type charging method such as a non-contact type scorntron charger may be used.

The development device 102 contains developer (not shown) including magnetic carriers and nonmagnetic toner. As the developer, a monocomponent developer may be used. The development device 102 may be roughly divided into an agitation section 303 and a development section 304. In the agitation section 303, bicomponent developer (hereinafter simplified as developer) is agitated and fed to be supplied onto a development sleeve 305 which serves as a developer carrier.

In the agitation section 303, two screws 306 which are parallel to each other are provided. Between those two screws 306, there is provided a dividing plate 309 so that spaces including the two screws 306 are in communication with each other at both ends of the dividing plate 309. Further, in a development case 308 containing the development sleeve 305 and the two screws 306 and the like, there is a toner density sensor 418 fixed to the development case 308. The toner density sensor 418 detects the toner density of developer in the development device 102. On the other hand, in the development section 304, toner of the developer fixed (supplied) onto the development sleeve 305 is transferred to the photosensitive body 101.

In the development section 304, the development sleeve 305 is provided so as to face the photosensitive body 101 via an opening of the development case 308. Further, inside the development sleeve 305, magnets (not shown) are provided and fixed to the development sleeve 305. Further, there is provided a doctor blade 307 in a manner such that one of the development sleeve 305 approaches the development sleeve 305. In this embodiment, the distance between the doctor blade 307 and the development sleeve 305 at the closest position is set to be 0.9 mm. In the development device 102, developer is agitated by the two screws 306 to be fed and circulated, so as to be fed onto the development sleeve 305. The developer supplied onto the development sleeve 305 is attracted by the magnets so as to be held on the development sleeve 305. The developer held on the development sleeve 305 is fed as the development sleeve 305 rotates, and is controlled by the doctor blade 307, so that only an appropriate amount of developer is held on the development sleeve 305. In this case, the developer removed from the development sleeve 305 by the doctor blade 307 is returned into the agitation section 303.

As described above, the developer fed to a development region facing the photosensitive body 101 is held upright by the magnets to form a magnetic brush. In the development region, due to a development bias applied to the development sleeve 305, the development (electrical) field is formed to move the toner under development to the electrostatic latent image part on the photosensitive body 101. By doing this, the toner under development is transferred to the electrostatiC latent image part on the photosensitive body 101, so that the electrostatic latent image part on the photosensitive body 101 is visualized and the corresponding toner image is formed. The toner having passed through the development region is fed to a position where the magnetic force of the magnet is weak, so that the toner is separated from the development sleeve 305 and returned into the agitation section 303. By repeating such an operation described above, when the toner density in the agitation section 303 is lowered. The lowered toner density is detected by the toner density sensor 418. Then, based on the detection result, toner is further supplied into the agitation section 303.

The photosensitive body cleaning device 311 is disposed in a manner such that an end of a cleaning blade 312 of the photosensitive body cleaning device 311 is biased to the photosensitive body 101. The cleaning blade 312 may be made of, for example, polyurethane rubber. Further, in this embodiment, to improve the cleaning performance, an electrically-conductive fur brush 310 to be in contact with the photosensitive body 101 is also used. In this case, a bias voltage is applied to the fur brush 310 from a metal (electrically) field roller (not shown). Further, a header of a scraper (not shown) is biased to the metal (electrically) field roller. Then, the toner removed from the photosensitive body 101 by the cleaning blade 312 and the fur brush 310 is contained inside of the photosensitive body cleaning device 311 and collected into a used toner collection device (not shown).

In the image forming unit 103, the surface of the photosensitive body 101 driven to rotate is uniformly charged by the charging device 301. Further, based on image information from a print controller 410 (see FIG. 3), the latent image writing unit 200 optically scans the writing light Lb to write the electrostatic latent image on the surface of the photosensitive body 101. The electrostatic latent image is developed by the development device 102 to become (form) a primary color toner image in any one of the Y, M, C, and K primary colors. The primary color toner image is primary transferred from the surface of the photosensitive body 101 to a front side surface of the intermediate transfer belt 105 in the primary transfer nip section. The toner still remaining on the surface of the photosensitive body 101 after passing through the primary transfer nip section (hereinafter may be referred to as not-transferred toner) is removed by the photosensitive body cleaning device 311.

Referring back to FIG. 1, by doing the processes described above, the image forming units 103Y, 103C, 103M, and 103K form the primary color toner images in Y, M, C, and K primary colors on the surfaces of the photosensitive bodies 101Y, 101C, 101M, and 101K, respectively. Those primary color toner images in Y, M, C, and K primary colors are superimposed and primary transferred onto the front side surface of the intermediate transfer belt 105 in the primary transfer nip sections for the Y, M, C, and K primary colors, respectively. By doing this, the superimposed toner image of the four colors is formed on the front side surface of the intermediate transfer belt 105.

Outside of the loop of the intermediate transfer belt 105, from among the entire regions along the circumferential direction of the intermediate transfer belt 105, at the position facing the supporting roller 112 via the intermediate transfer belt 105, there is provided a secondary transfer roller 108 that is in contact with the intermediate transfer belt 105 so as to form a secondary transfer nip section. To the secondary transfer roller 108 is applied to a secondary transfer bias voltage having a polarity opposite to the charge polarity of the toners. Blow the secondary transfer nip section, a pair of resist rollers is provided. The pair of resist rollers feeds the recording sheet 115 to the secondary transfer nip section at the timing in synchronization with the superimposed toner image of the four colors on the intermediate transfer belt 105. When the recording sheet 115 is fed into the secondary transfer nip section, the superimposed toner image of the four colors on the intermediate transfer belt 105 is collectively secondary transferred onto the recording sheet 115 by the secondary transfer bias voltage and a nip pressure (a pressure applied to the secondary transfer nip section). Then, along with the white color of the recording sheet 115, the superimposed toner image of the four colors becomes a full-color toner image. In this case, in place of the secondary transfer roller 108, the scorotron charger or the like may be used.

Above the secondary transfer roller 108 in the figure, there is provided a fixing device 111 to fix the full-color toner image onto the recording sheet 115 on which the full-color toner image has been transferred. The fixing device 111 includes a heating roller 117 and a pressing roller 118, so that the pressing roller 118 is pressed to the heating roller 117. The fixing device 111 further includes a spectrometer 109 serving as a color measurement unit that measures colors of the full-color toner image as the measurement target formed on a recording sheet P having passed through a fixing nip section formed by a (press) contact between the pressing roller 118 and the heating roller 117. As the spectrometer 109, for example, a device disclosed in Japanese Laid-open Patent Publication No. 2005-315883 may be used.

Outside of the loop of the intermediate transfer belt 105, from among the entire regions along the circumferential direction of the intermediate transfer belt 105, at the position facing the supporting roller 113 via the intermediate transfer belt 105, there is provided a belt cleaning device 110 that is in contact with the intermediate transfer belt 105 to remove the remaining toner adhered to the intermediate transfer belt 105 after the toner passes through the secondary transfer nip section.

Figure 3:
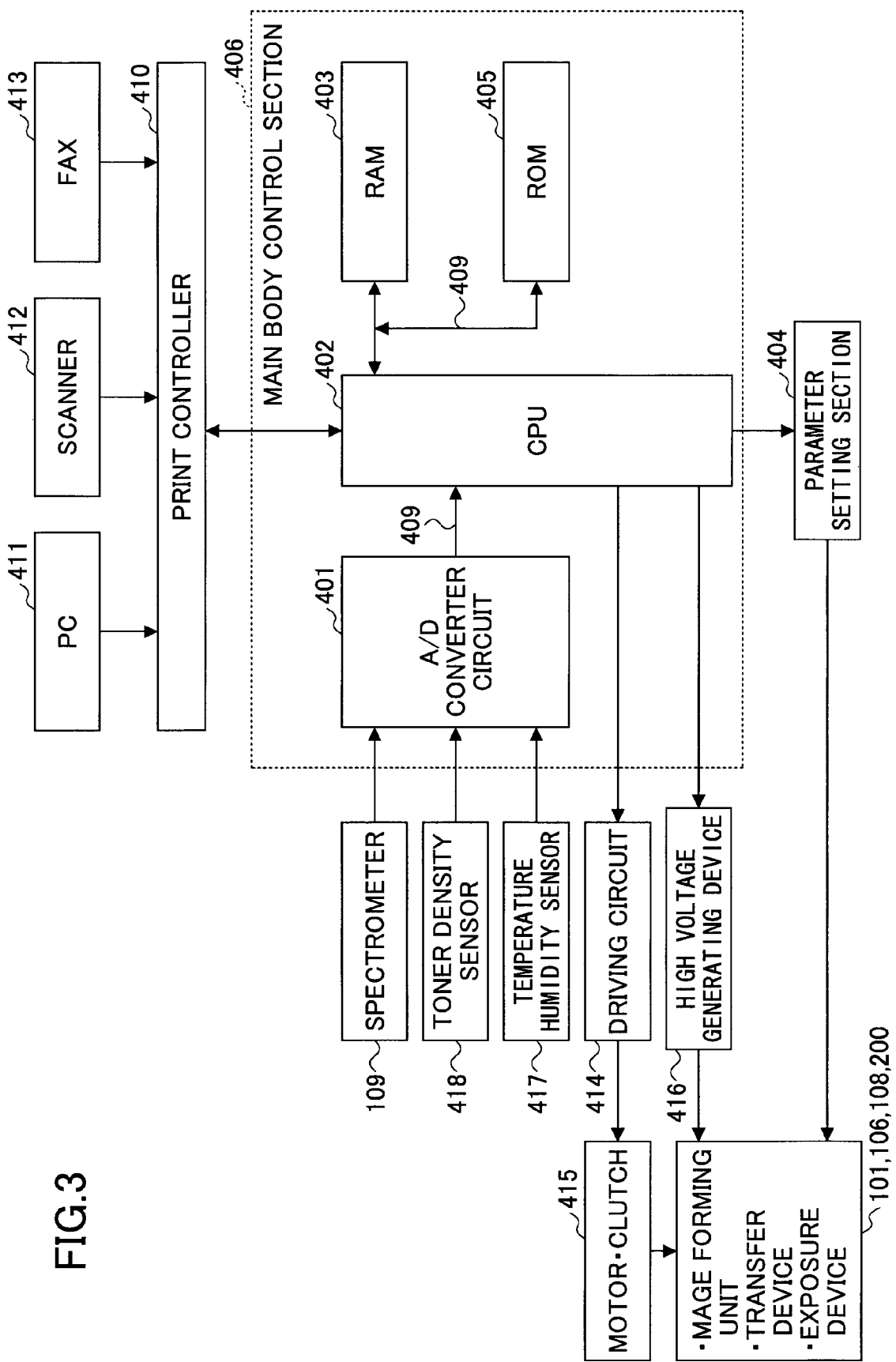
FIG. 3 is a block diagram illustrating electrical connections of various devices in the printer according to the embodiment.

FIG. 3 is a block diagram illustrating electrical connections among the elements in the printer 100. The printer 100 includes a main body control section 406 serving as a control device. By driving and controlling the elements by the main body control section 406, the main body control section 406 controls the image forming operation using the electrophotographic process. The main body control section 406 includes a CPU (Central Processing Unit) 402 to execute various calculations and control to drive the elements, a ROM (Read Only Memory) 405 storing fixed data such as a computer program via a bus line 409, a RAM (Random Access Memory) 403 serving as a working area rewritably storing various data, and the bus line 409 through which the CPU 402, the ROM 405, and the RAM 403 are electrically connected with each other. The main body control section 406 further includes an A/D (Analog-to-Digital) converter circuit 401 that converts the data (information) from the spectrometer 109 serving as the color measurement unit, the toner density sensor 418, and a temperature/humidity sensor 417. The A/D converter circuit 401 is electrically connected (hereinafter simplified as connected) to the CPU (Central Processing Unit) 402 via the bus line 409.

The main body control section 406 is connected to the print controller 410. The print controller 410 performs a process on the image data transmitted from a PC (Personal Computer) 411, a scanner 412, a FAX (Facsimile) machine 413 and the like to convert the image data into exposure data. Further, the main body control section 406 is connected to a driving circuit 414 driving a motor/clutch 415. The main body control section 406 is further connected to a high voltage generating device 416 generating a voltage necessary for an image forming section (the image forming unit 103, the primary transfer roller 106, the latent image writing unit 200, the secondary transfer roller 108, and the like) to form an image.

Further, the main body control section 406 is further connected to a parameter setting section 404. To obtain stable image density, the parameter setting section 404 changes image processing parameters based on the results calculated by the CPU 402 using the data (information) measured by the spectrometer 109 and the like. The image processing parameters include a laser strength of the latent image writing unit 200, a charge applied voltage of the charging device 301, a development bias voltage of the development device 102 and the like.

When the printer 100 prints based on the information from the PC 411, a printer driver installed in the PC 411 is used to transmit the printing information including image data from the PC 411 to the printer 100. The print controller 410 corresponding to the image processing unit receives the printing information including image data transmitted from the PC 411 and performs a process on the image data to convert the image data into the exposure data, and outputs a print instruction to the main body control section 406. The CPU 402 of the main body control section 406 having received the print instruction performs an image forming control process using the electrophotographic process in accordance with the computer program of the ROM 405. More specifically, the CPU 402 of the main body control section 406 drives the motor/clutch 415 via the driving circuit 414 to drive to rotate the supporting roller 112 to drive to rotate the intermediate transfer belt 105. Further, simultaneously, the CPU 402 of the main body control section 406 drives the image forming section (the image forming unit 103, the primary transfer roller 106, the latent image writing unit 200, the secondary transfer roller 108, and the like) using the electrophotographic process via the driving circuit 414, the high voltage generating device 416, and the parameter setting section 404.

The main body control section 406 controls the sheet feeding device (not shown) to feed the recording sheet 115 by driving the motor/clutch 415 via the driving circuit 414 in synchronization with the timing when the superimposed toner image of the four colors formed on the intermediate transfer belt 105 as described above is fed into the secondary transfer nip section. The recording sheet 115 fed by the sheet feeding device is fed between the intermediate transfer belt 105 and the secondary transfer roller 108, and due to the secondary transfer roller 108, the superimposed (composite) image on the intermediate transfer belt 105 is secondary transferred onto the recording sheet 115. After that, while being adsorbed to (pressed by) the (rotating) secondary transfer roller 108, the recording sheet 115 is fed to the fixing device 111, so that the recording sheet 115 is pressed and heated to fix the toner image. The recording sheet 115 having passed through the fixing device 111 is discharged to a discharge tray (not shown) and stacked. Further, the not-transferred toner which remains on the intermediate transfer belt 105 after the secondary transfer is removed by the belt cleaning device 110.

Figure 4:
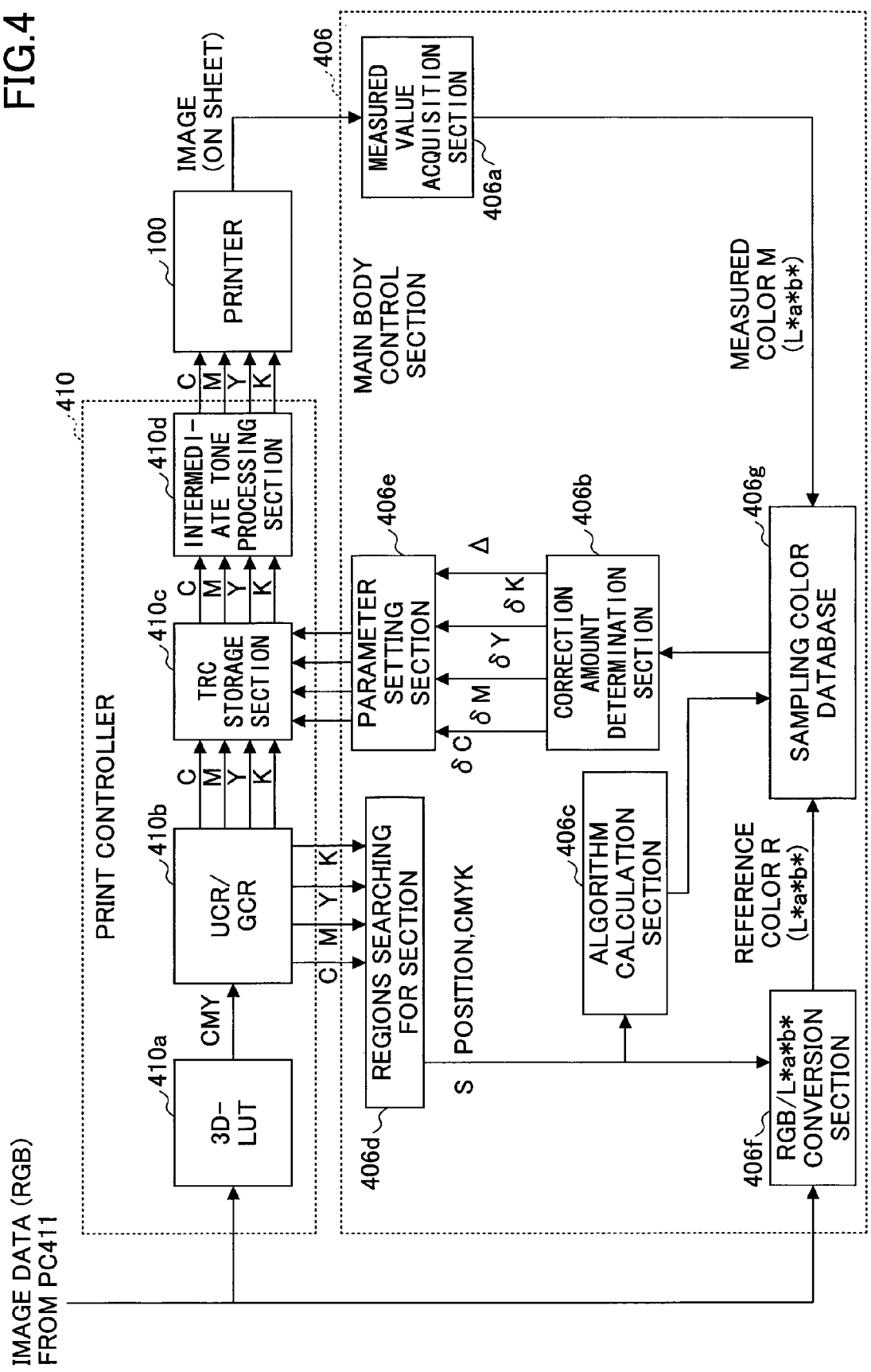
FIG. 4 is a block diagram illustrating a main body control section and a surrounding configuration of the printer of the embodiment.

Next, a characteristic configuration of the printer according to an embodiment is described. FIG. 4 is a block diagram of the main body control section 406 and its peripheral elements. As illustrated in FIG. 4, the main body control section 406 includes a measured value acquisition section 406a, a correction amount determination section 406b, an algorithm calculation section 406c, a region searching for section 406d, a parameter setting section 406e, an RGB/L*a*b* conversion section 406f, and a sampling color database 406g. Those elements are not provided by corresponding hardware but are configured (realized) by a program stored in the data storage in the main body control section 406. On the other hand, the print controller 410 includes a 3D-LUT (3D Look Up Table) 410a, a UCR/GCR (Under Color Removal/Gray Component Replacement) 410b, and a TRC (Tone Reproduction Curve) storage section 410c storing setting values expressing the TRC, and an intermediate tone processing section 410d.

Figure 5:
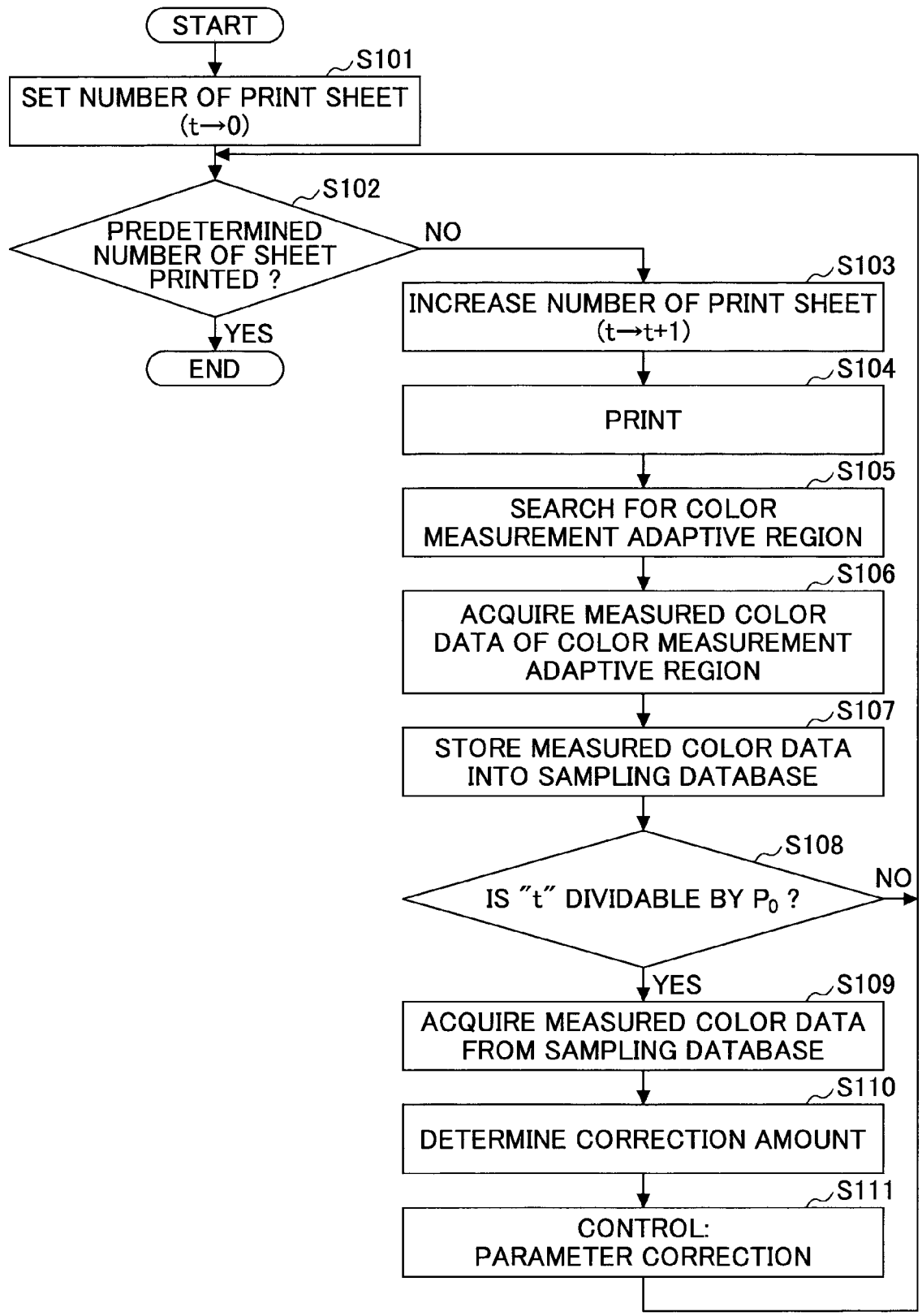
FIG. 5 is a flowchart illustrating a color reproduction accuracy improvement process performed by the main body control section.

FIG. 5 is a flowchart illustrating a color reproduction accuracy improvement process performed by the main body control section 406. In the color reproduction accuracy improvement process, when a print job starts, a value of a counter "t" denoting the number of sheets to be printed is set to zero (t=0) (step S101). Next, it is determined whether a predetermined number of sheets are printed (step S102). When determining that the predetermined number of sheets are printed (YES in step S102), the print job is finished. On the other hand, when determining that the predetermined number of sheets are not printed (NO in step S102), the value of the counter "t" denoting the number of sheets to be printed is increased by one (t→t+1) (step S103). Then, image data of a new "t"th sheet is printed (step S104). Then, a region searching-for process is performed (step S105). Herein, the region searching-for process refers to a process of searching for a color measurement adaptive region which is adapted to measure superimposed colors in an image based on image information of the image to be output, and is performed by the region searching for section 406*d* (see FIG. 4). Before the region searching-for process is performed, the image information of the image to be output is acquired by the print controller 410 (see FIG. 4). The image information externally transmitted includes pixel values representing color values (brightness) of R (red), G (green), and B (blue) color components with respect to a plurality of pixels arranged in a matrix manner in the image. The print controller 410, however, converts the image information so that the converted image information includes pixel values representing color values (brightness) of C (cyan), M (magenta), Y (yellow), and black (K) color components. Then, the converted image information is transmitted (supplied) to the region searching for section 406*d* of the main body control section 406.

Then, the region searching for section 406*d* searches for the color measurement adaptive region by determining which region is to be the color measurement adaptive region from the entire region of the image expressed by the image information. After searching for the color measurement adaptive region, the recording sheet 115 on which the image of the color measurement adaptive region is formed is fed into the fixing device 111 (see FIG. 1). Then, the colors of the color measurement adaptive region are measured by the spectrometer 109 in the fixing device 111. A result of the color measurement is acquired by the measured value acquisition section 406*a* of the main body control section 406.

Searching for the color measurement adaptive region is performed as described below. Namely, the pixel at a predetermined position on the pixel matrix expressed by the image information is regarded as an attention pixel. Then, a partial region corresponding the attention pixel is determined (defined) as the region including attention pixel as the region and having a predetermined size, and the determined partial region is extracted. For example, in an initial (first) extraction of the partial region, as the attention pixel, the pixel which is 21st column and 21st row counted from the left upper end of the image in the pixel matrix of 200 dpi may be selected. Then, the partial region may be defined as a region having the attention pixel as the center and having a size of 41 pixels by 41 pixels. By doing this, approximately five mm square is extracted as the partial region (this corresponds to a square having 61 pixels by 61 pixels in 300 dpi). Then, with reference to the pixel values (C, M, Y, and K) of the pixels of the extracted partial region, a flatness degree indicating the flatness of the shading (gray value) of the entire partial region is calculated. As the flatness degree, any appropriate value calculated in various method may be used. As the first example of the flatness degree, a value obtained based on the following calculation method may be used. Namely, for each of the C, M, Y, and K colors, the variance of each of the pixels is obtained (measured). Then, the sum of the variances is obtained, and a minus sign is appended to the sum so as to be determined as the flatness degree in the partial region. As the second example of the flatness degree, the determinant of the variance-covariance matrix may be used. Specifically, for each of the C, M, Y, and K colors, the variance and covariance of each of the pixels in the partial region are obtained. Next, a 4×4 variance-covariance matrix in which the variances are arranged in the diagonal components and the covariances are arranged in the nondiagonal components is provided, and the determinant of the variance-covariance matrix is calculated. Then, a minus sign is appended to the determinant so as to be determined as the flatness degree in the partial region. By using the determinant of the variance-covariance matrix, the spread (extent) of the distribution in CMYK spaces may be evaluated (estimated). Namely, when compared with the first example of the flatness degree, it may be superior because spread (extent) of the distribution in different color components is evaluated. As the third example of the flatness degree, a value using the frequency characteristics of the colors may be used. Specifically, Fourier transformation is performed using pixel values in the partial region, and a sum of the square of the absolute values of the Fourier coefficients of a specific frequency is obtained. Then, a minus sign is appended to the sum so as to be determined as the flatness degree in the partial region. As the specific frequency, plural frequencies may be used. In the flatness degree of the first example, a region which is to be flat may not be recognized due to an influence of the pattern of a halftone process with respect to an image on which the halftone process is performed. On the other hand, in the flatness degree of the third example, by using the sum of the square of the absolute values of the Fourier coefficients of a specific frequency, the flatness degree which is not influenced by the halftone process may be obtained. The flatness degree is not limited to the first through the third examples, and any appropriate flatness degree calculated using a known flatness degree calculation method may be used.

After the flatness degree of the extracted partial region is obtained (calculated), it is determined whether all the partial regions are extracted (i.e., it is determined whether the extraction of the partial regions in the entire image region is completed). When determining that all the partial regions are not extracted, the position of the attention pixel is shifted by only one pixel in the right-hand direction, the region having the shifted attention pixel as the center and having a size of 41 pixels by 41 pixels so as to have approximately five mm square size is extracted as the partial region. Then, in the same manner, the flatness degrees of the colors of the extracted partial region are calculated. After that, when the third, the fourth, the fifth, . . . , the nth partial regions are extracted, the position of the attention pixel is sequentially shifted by one pixel. Then, after the position of the attention pixel in the column direction is shifted to the position which is 21st position from the right end of the image toward left direction, the position of the attention pixel in the column direction is returned to the position which is 21st position from the left end of the image toward right direction, and at the same time the position of the attention pixel in the row direction is shifted by only one pixel in the lower direction. After that, the process of shifting the position of the attention pixel toward right direction is repeated. As described above, the position of the attention pixel is shifted as the raster scan to cover the entire region of the image.

Further, instead of sequentially shifting the attention pixel by one pixel as described above, the partial regions may be extracted in a manner such that the edge portions of the partial regions are not overlapped with each other. To that end, for example, after the partial region having the center at the position of the attention pixel which is 21st column and 21st row counted from the left upper end of the image and having a size of 41 pixels by 41 pixels is extracted, the partial region having the center at the position of the attention pixel which is 62nd column and 62nd row counted from the left upper end of the image and having a size of 41 pixels by 41 pixels may be extracted next.

After the partial regions are extracted from the entire region of the image and the flatness degrees in the partial regions are calculated, the partial region having the most superior flatness degree than any other partial regions in the entire image is specified. Then, it is determined whether the specified flatness degree is better than a predetermined reference flatness degree. When determining that the specified flatness degree is better than the predetermined reference flatness degree, the partial region having the specified flatness degree is determined as the color measurement adaptive region adapted to measure colors.

Figure 6:
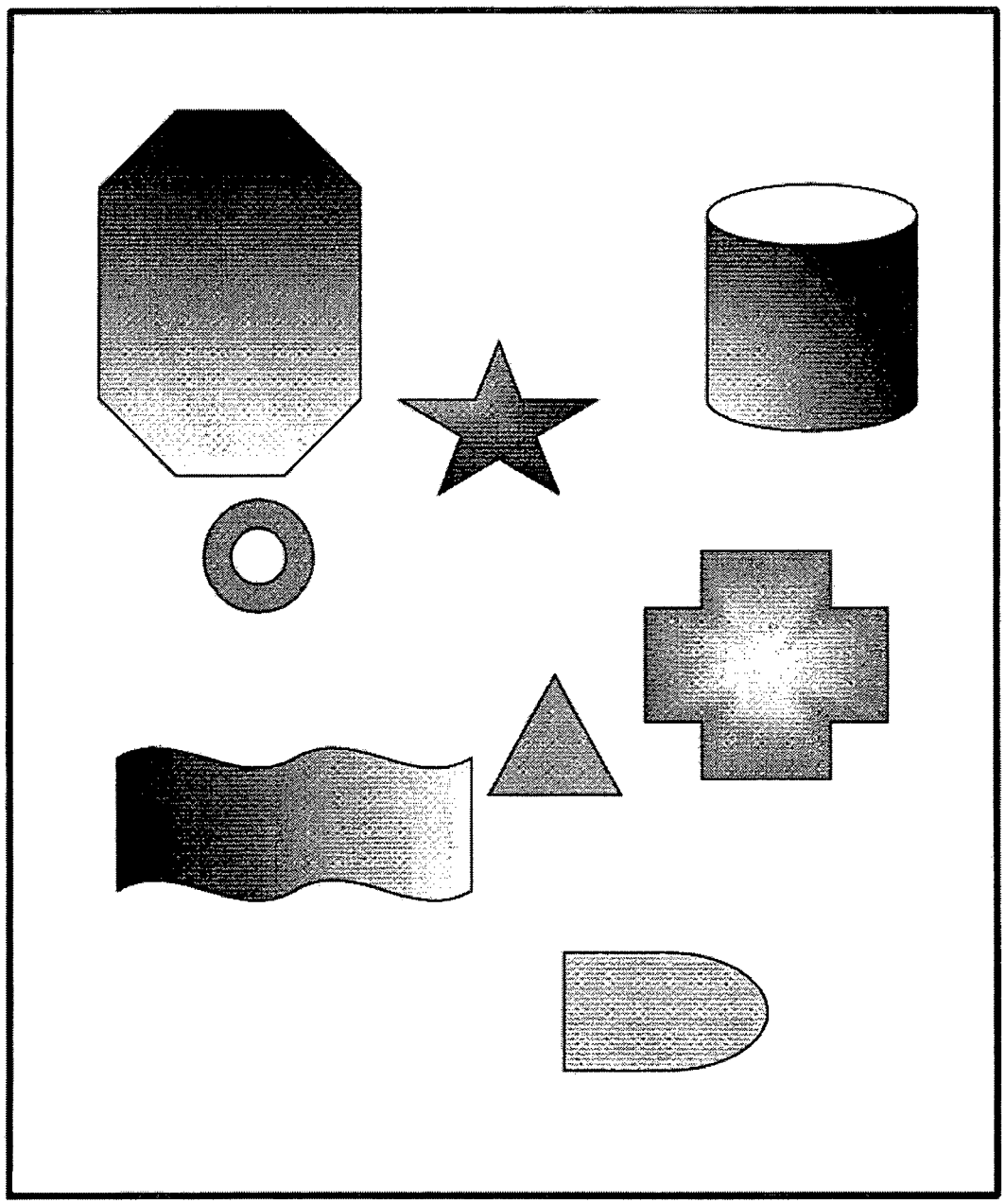
FIG. 6 is a drawing illustrating example images expressed by image information provided by a user.
Figure 7:
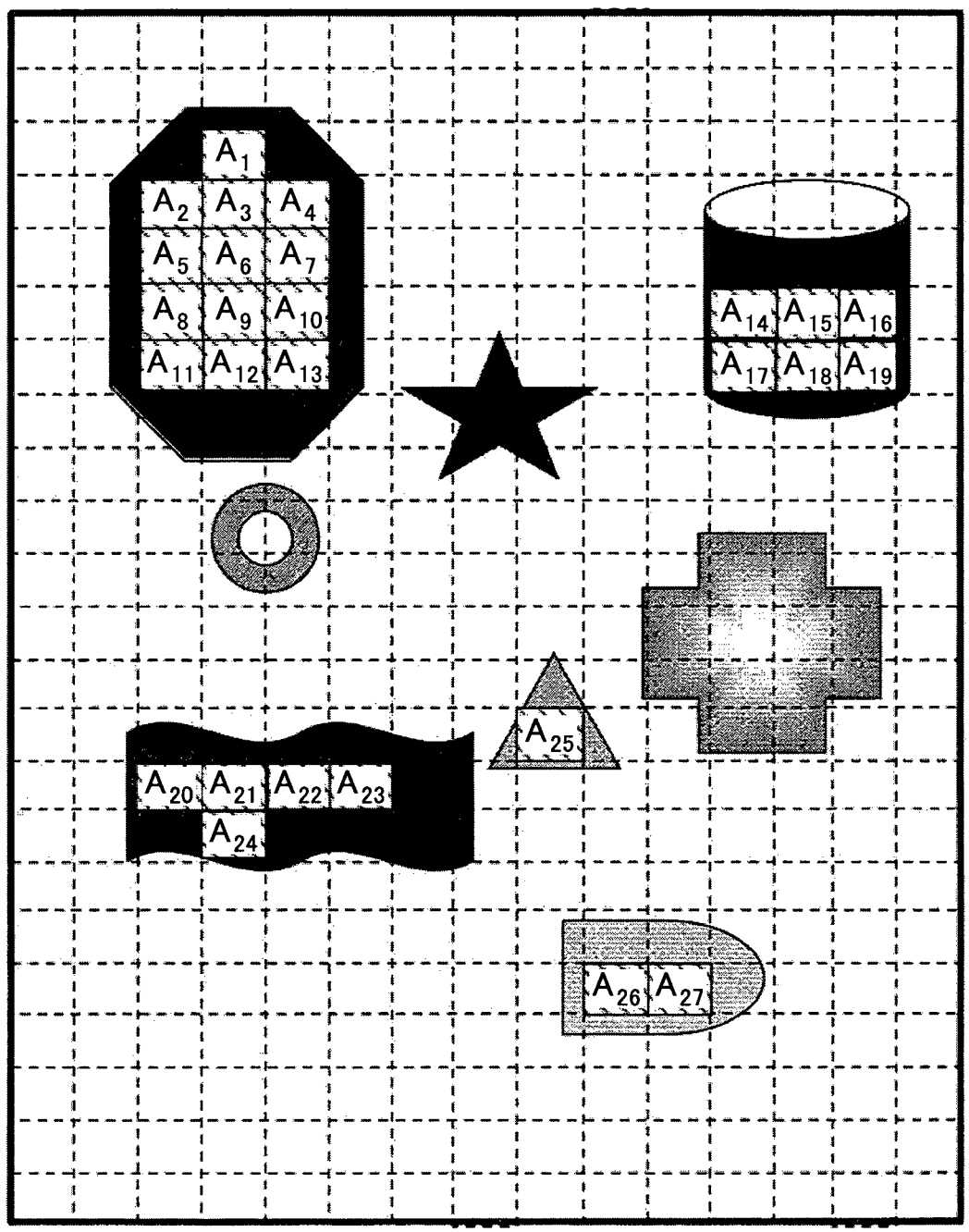
FIG. 7 is a schematic drawing illustrating color measurement adaptive regions having been searched for from the images expressed by the image information provided by the user.

When such a region searching-for process is performed, for example, in a case of the image of FIG. 6, twenty-seven color measurement adaptive regions denoted by the symbols $A_1$ through $A_{27}$ may be searched for as illustrated in FIG. 7.

After the region searching-for process is completed, the measured value acquisition section 406a (see FIG. 4) measures the color (i.e., L*a*b*) of the printed image output on the sheet, and acquires measured color data in the color measurement adaptive region calculated in step SS105 in FIG. 5 (step S106). Next, the acquired measured color data are stored into the sampling color database 406g (see FIG. 4) (step S107). With respect to the "t"th output image, The sampling color database 406g stores 1) sampling position color $S^{(t)}$, 2) an L*a*b* target value $R^{(t)}$, and 3) an output image measured value $M^{(t)}$. By measuring the colors of the toner images of plural sheets and storing the measured color data into the sampling color database 406g, it may become possible to store and use a large amount of image data evenly including various colors in a range from a color having lower density to a color having higher density. Therefore, it may become possible to maintain the smoothness of the tone reproduction curve and control the change of the difference from the ideal tone reproduction curve. As a result, it may become possible to prevent the occurrence of recognizable discontinuity of the tone and recognizable color variation between before and after the correction.

Next, details of the sampling position color $S^{(t)}$, the L*a*b* target value $R^{(t)}$, and the output image measured value $M^{(t)}$ in "t"th output image are described.

First, the sampling position color $S^{(t)}$ is described. The $N^{(t)}$ sampling position color $S^{(t)}$ with respect to the "t"th output image and determined by the region searching for section 406d is expressed in the following formula (1), and stored into the sampling color database 406g.

$$S^{(t)} = \{(x_i^{(t)}, y_i^{(t)}, c_i^{(t)}, m_i^{(t)}, y_i^{(t)}, k_i^{(t)}): i=1, 2, \ldots, N^{(t)}\} \quad (1)$$

Where, $(x_i^{(t)}, y_i^{(t)})$ denote the "i"th sampling position on the output image, and $(c_i^{(t)}, m_i^{(t)}, y_i^{(t)}, k_i^{(t)})$ denote the C, M, Y, and K densities of corresponding image data.

Second, the L*a*b* target value $R^{(t)}$ is described. The L*a*b* target value $R^{(t)}$ determined by the algorithm calculation section 406c by referring to the sampling position recorded in the above $S^{(t)}$ based on the original image data (RGB) is expressed by the following formula (2), and stored into the sampling color database 406g.

$$R^{(t)} = \{(\overline{L}_i^{(t)}, \overline{a}_i^{(t)}, \overline{b}_i^{(t)}): i=1, 2, \ldots, N^{(t)}\} \quad (2)$$

Where, $$(\overline{L}_i^{(t)}, \overline{a}_i^{(t)}, \overline{b}_i^{(t)})$$

denotes the L*a*b* target value obtained by converting the RGB values at the "i"th sampling position $(x_i^{(t)}, y_i^{(t)})$ on the output image at time "t".

Third, the output image measured value $M^{(t)}$ is described. The output image measured value $M^{(t)}$ obtained by the measured value acquisition section 406a (see FIG. 4) based on the measured colors of the output sheet on which a user's image is formed by referring to the sampling position recorded in the above $S^{(t)}$ is expressed by the following formula (3), and stored into the sampling color database 406g.

$$M^{(t)} = \{(L_i^{(t)}, a_i^{(t)}, b_i^{(t)}): i=1, 2, \ldots, N^{(t)}\} \quad (3)$$

Where, $(L_i^{(t)}, a_i^{(t)}, a_i^{(t)})$ denotes the L*a*b* target value at the "i"th sampling position $(x_i^{(t)}, y_i^{(t)})$ on the output image at time "t".

Next, in step S108 of FIG. 5, it is determined whether "t" is dividable by a predetermined control period $P_0$ (i.e., whether t MOD $P_0$ is equal to zero). When determining that "t" is dividable by a predetermined control period $P_0$, with respect to past $P_0$ sheets of data (i.e., t, t–1, ..., t–$P_0$+1), the sampling position color $S^{(t)}$, the L*a*b* target value $R^{(t)}$, and the output image measured value $M^{(t)}$ are acquired from the sampling color database 406g (see FIG. 4) (YES in step S108 and step S109). On the other hand, when determining that "t" is not dividable by a predetermined control period $P_0$, the process goes back to step S102, and when determining that the predetermined number of sheets are not printed (NO in step S102), the value of the counter "t" denoting the number of sheets to be printed is increased by one (t→t+1) (step S103). Then, the region searching-for process is performed on the next image data. When the measured color data are acquired from the sampling color database 406g (step S109), the correction amount determination section 406b performs a correction amount determination process (step S110) to determine the correction amounts corresponding to the setting values expressing the tone reproduction curves TRC of the Y, M, C, K colors. Based on the correction amounts corresponding to the setting values expressing the tone reproduction curves TRC and the setting values expressing the tone reproduction curves TRC, the parameter setting section 406e (see FIG. 4) performs a control parameter correction process to correct the setting values expressing the tone reproduction curves TRC (step S111). Then, the process goes back to step S102 to perform the processes on the next image data.

Next, in the following, details of the correction amount determination process in step S110 of FIG. 5 are described. Herein, it is assumed that each density (i.e., area ratio) of the Y, M, C, and K primary colors is quantized in L levels from 0 level to (L–1) level. Namely, 0 level refers to a blank, and (L–1) level refers to solid. For example, L=256. The tone reproduction curve TRC is expressed by functions $\tau_c$, $\tau_m$, $\tau_y$, and $\tau_k$ as illustrated in the following formula (4) determined for each of the Y, M, C, and K primary colors.

$$\tau_c, \tau_m, \tau_y, \tau_k: \{0, 1, \ldots, L-1\} \to \{0, 1, \ldots, L-1\}$$

$$\tau_c(0) = \tau_m(0) = \tau_y(0) = \tau_k(0) = 0,$$

$$\tau_c(L-1) = \tau_m(L-1) = \tau_y(L-1) = \tau_k(L-1) = L-1 \quad (4)$$

The outputs of the tone reproduction curve corresponding to the input 0 (blank) and the input (L–1) (solid) are fixed to 0 and (L–1), respectively. The setting values expressing the tone reproduction curves of the Y, M, C, and K primary colors at time "t" are given as $\tau_c^{(t)}, \tau_m^{(t)}, \tau_y^{(t)}$, and $\tau_k^{(t)}$, respectively. The variations $\delta_c, \delta_m, \delta_y$, and $\delta_k$ corresponding to the setting values expressing the tone reproduction curves are determined as expressed in the following formula (5) by "TRC control".

$$\delta_c, \delta_m, \delta_y, \delta_k: \{0, 1, \ldots, L-1\} \to \{0, 1, \ldots, L-1\}$$

$$\delta_c(0) = \delta_m(0) = \delta_y(0) = \delta_k(0),$$

$$\delta_c(L-1) = \delta_m(L-1) = \delta_y(L-1) = \delta_k(L-1) = 0 \quad (5)$$

Then, the setting values expressing the tone reproduction curves at time "t+1" are determined as the following formula (6)

$$\tau_c^{(t+1)}(x)=\tau_c^{(t)}(x)+\delta_c(x), \tau_m^{(t+1)}(x)=\tau_m^{(t)}(x)+\delta_m(x),$$

$$\tau_y^{(t+1)}(x)=\tau_y^{(t)}(x)+\delta_y(x), \tau_k^{(t+1)}(x)=\tau_k^{(t)}(x)+\delta_k(x)$$

$$x=0, 1, \ldots, L-1 \tag{6}$$

Figure 8:
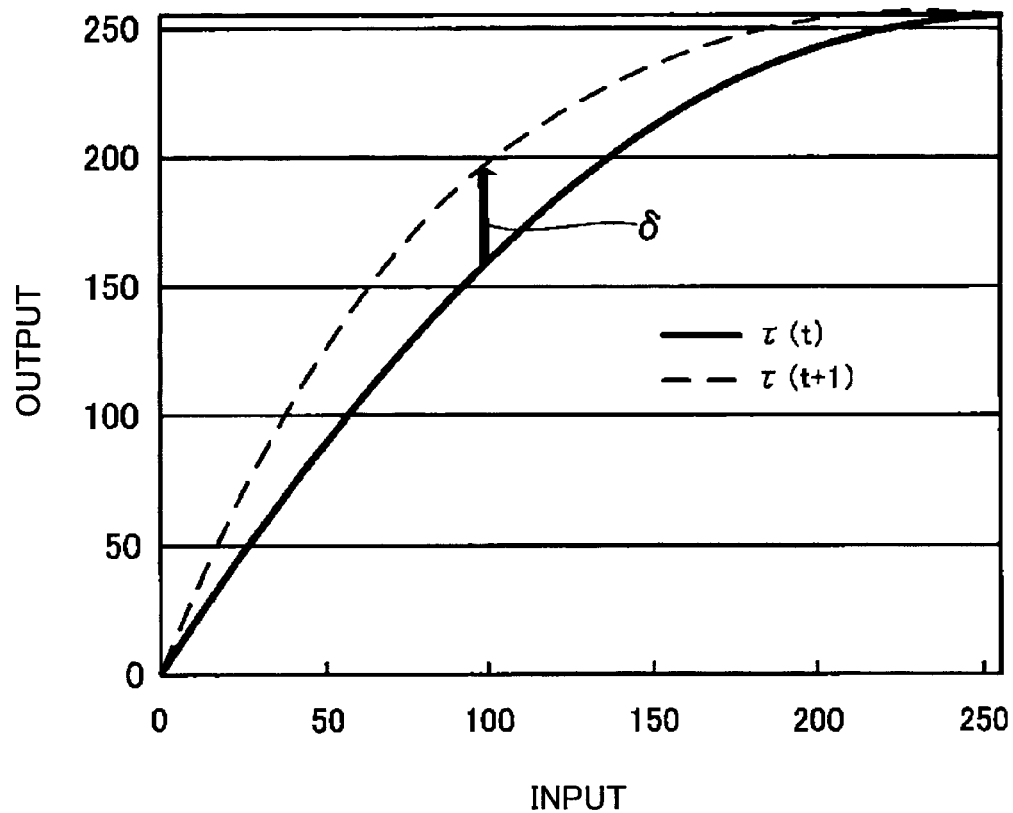
FIG. 8 is a characteristic diagram illustrating relationships between the tone reproduction curves $\tau(t)$ and $\tau(t+1)$ at time t and t+1, respectively and variation $\delta$ when L=256.

FIG. 8 is a characteristic diagram illustrating the tone reproduction curves at time "t" and "t+1" and a correction amount δ. More specifically, FIG. 8 illustrates examples of the tone reproduction curves τ(t) and τ(t+1) at time "t" and "t+1", respectively, and variation δ when L=256.

Further, with respect to the CMYK data (c,m,y,k), the measured value on the sheet at time "t" is assumed to be (L, a, b). After shifting the setting values expressing the tone reproduction curves by variations $\delta_c$, $\delta_m$, $\delta_y$, and $\delta_k$, the estimated value
$(\hat{L},\hat{a},\hat{b})$
is given by the following formula (7).

$$\begin{pmatrix} \hat{L} \\ \hat{a} \\ \hat{b} \end{pmatrix} = \begin{pmatrix} L \\ a \\ b \end{pmatrix} + \begin{pmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{pmatrix} \begin{pmatrix} \delta_c(c) \\ \delta_m(m) \\ \delta_y(y) \\ \delta_k(k) \end{pmatrix} \tag{7}$$

Wherein $$\begin{pmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{pmatrix} \tag{8}$$

is a Jacobian matrix including partial differential coefficients of the CMYK density (c, m, y, k) of each component of L*a*b*, namely, variation of each component of L*a*b* when each component of the CMYK density (c, m, y, k) is slightly changed. This matrix may be obtained based on data of the measured color data of the superimposed color toner image when CMYK input values are variously changed.

Further, clustering is performed on the data stored in the sampling color database 406g (see FIG. 4) in the CMYK digital data space (i.e., $c_i^{(t)}$, $m_i^{(t)}$, $y_i^{(t)}$, and $k_i^{(t)}$ components of $S^{(t)}$, and the TRC control is started using the cluster average of the L*a*b* (target value and measured value). Further, to reduce the intra-page variance and the measurement error due to the eccentricity of the photoconductor drum, the CMYK values are divided into cells so that the TRC control points are represented by the centers of the cells and calculated. Further, when the number of data in the cell is increased, more of the errors may be cancelled. Therefore, the reliability may be improved. A scheme is introduced that reliability degree based on the number of data in the cell is applied to the cell.

Figure 9:
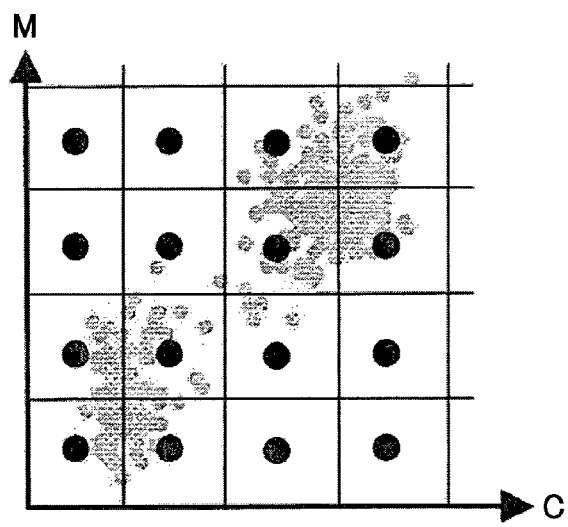
FIG. 9 is a schematic drawing illustrating the densities on four divided cells in CM space and the center points of the cells.

As illustrated in FIG. 9, for each of the Y, M, C, and K primary colors, $Q^4$ cells (i.e., four dimensional hypercube) in a CMYK four-dimensional space where the density (0 to (L−1)) is divided by Q (Q is a divisor of L) is assumed. FIG. 9 illustrates cell divisions of CMYK (CM) densities and the center points. Namely, this example is a CM space which is divided by four (Q=4). The TRC control points are represented by the center points (black circles) of the cells.

$$P(q_c, q_m, q_y, q_k) = \tag{9}$$

$$\left\{ (c, m, y, k): q_c \leq \frac{Qc}{L} < q_c + 1, q_m \leq \frac{Qm}{L} < q_m + 1, \\ q_y \leq \frac{Qy}{L} < q_y + 1, q_k \leq \frac{Qk}{L} < q_k + 1 \right\}$$

The center of cell P ($q_c$, $q_m$, $q_y$, $q_k$) is given in the following formula (10).

$$\left( \frac{L}{Q}\left(q_c + \frac{1}{2}\right), \frac{L}{Q}\left(q_m + \frac{1}{2}\right), \frac{L}{Q}\left(q_y + \frac{1}{2}\right), \frac{L}{Q}\left(q_k + \frac{1}{2}\right) \right) \tag{10}$$

Figure 10:
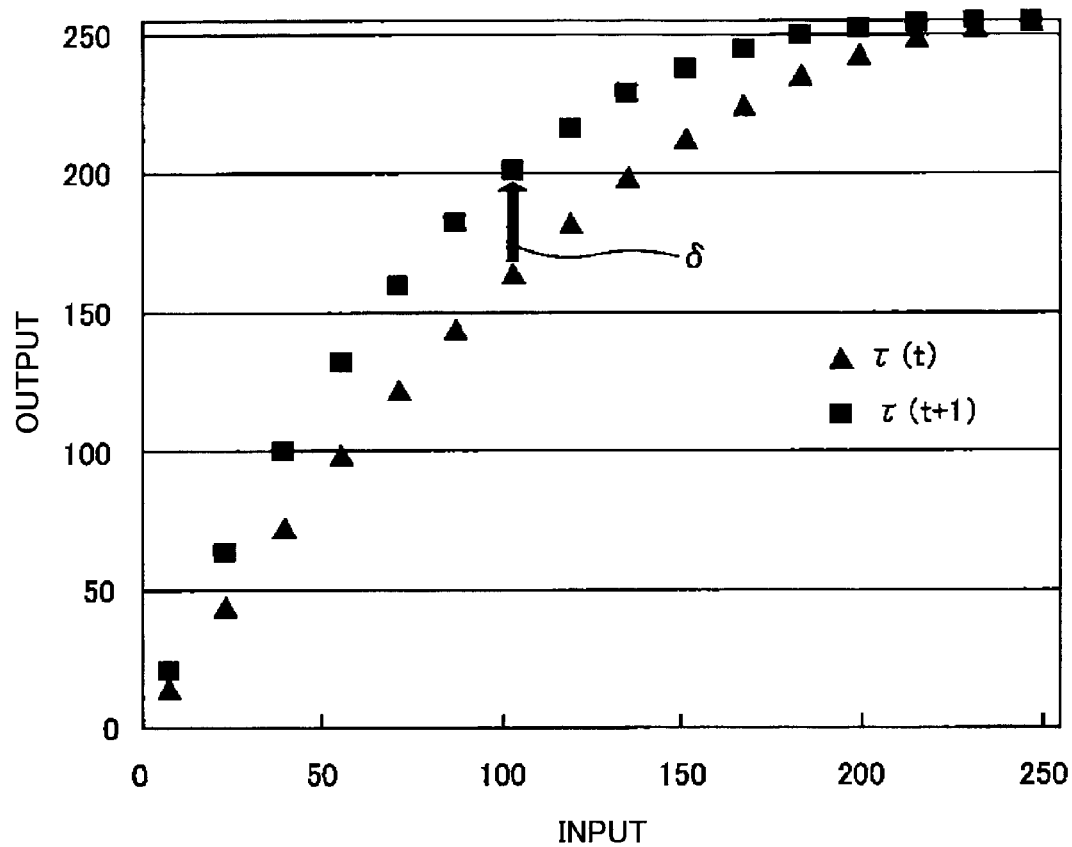
FIG. 10 is a characteristic diagram illustrating relationships between control points of the tone reproduction curves and variation $\delta$ at time t and t+1 when L=235.

When a sampling color has the CMYK values included in the cell P ($q_c$, $q_m$, $q_y$, $q_k$), the TRC variance is calculated as represented by the lattice point (10) corresponding to the center point of the cell P ($q_c$, $q_m$, $q_y$, $q_k$). FIG. 10 illustrates an example of TRC control points and variance amount when L=256 and Q=16.

After "$t_0$"th sheet is printed, data are maintained in the sampling color database 406g (see FIG. 4). Then, in the correction amount determination section 406b, by using the sampling position color. $S^{(t)}$, the L*a*b* target value $R^{(t)}$, and the output image measured value $M^{(t)}$ of the image data (t=$t_0$, $t_0$−1, . . . , $t_0$−1, $t_0$−$P_0$+1) of the past $P_0$ sheets, 4Q TRC variation is expressed as in the following formula (11)

$$\delta_c\left(\frac{L}{Q}\left(q_c + \frac{1}{2}\right)\right), \tag{11}$$

$$\delta_m\left(\frac{L}{Q}\left(q_m + \frac{1}{2}\right)\right),$$

$$\delta_y\left(\frac{L}{Q}\left(q_y + \frac{1}{2}\right)\right),$$

$$\delta_k\left(\frac{L}{Q}\left(q_k + \frac{1}{2}\right)\right)$$

$$q_c, q_m, q_y, q_k = 0, 1, \ldots, Q-1$$

By using the above as the variables, an evaluation function J is defined as in the following formula (12).

$$J = \frac{1}{\sum_{t=t_0-P_0+1}^{t_0} w(t-t_0)N^{(t)}} \tag{12}$$

-continued $$\sum_{t=t_0-P_0+1}^{t_0} w(t-t_0) \sum_{i=1}^{N(t)} \left\| \begin{pmatrix} L_i^{(t)} - \overline{L}_i^{(t)} \\ a_i^{(t)} - \overline{a}_i^{(t)} \\ b_i^{(t)} - \overline{b}_i^{(t)} \end{pmatrix} + \begin{pmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{pmatrix} \begin{pmatrix} \delta_c\left(\frac{L}{Q}\left(\left\lfloor\frac{Qc_i^{(t)}}{L}\right\rfloor+\frac{1}{2}\right)\right) \\ \delta_m\left(\frac{L}{Q}\left(\left\lfloor\frac{Qm_i^{(t)}}{L}\right\rfloor+\frac{1}{2}\right)\right) \\ \delta_y\left(\frac{L}{Q}\left(\left\lfloor\frac{Qy_i^{(t)}}{L}\right\rfloor+\frac{1}{2}\right)\right) \\ \delta_k\left(\frac{L}{Q}\left(\left\lfloor\frac{Qk_i^{(t)}}{L}\right\rfloor+\frac{1}{2}\right)\right) \end{pmatrix} \right\|^2 +$$

$$\alpha \sum_{q=1}^{Q-2} \left\| \begin{pmatrix} \delta_c\left(\frac{L}{Q}\left(i-\frac{1}{2}\right)\right) - 2\delta_c\left(\frac{L}{Q}\left(i+\frac{1}{2}\right)\right) + \delta_c\left(\frac{L}{Q}\left(i+\frac{3}{2}\right)\right) \\ \delta_m\left(\frac{L}{Q}\left(i-\frac{1}{2}\right)\right) - 2\delta_m\left(\frac{L}{Q}\left(i+\frac{1}{2}\right)\right) + \delta_m\left(\frac{L}{Q}\left(i+\frac{3}{2}\right)\right) \\ \delta_y\left(\frac{L}{Q}\left(i-\frac{1}{2}\right)\right) - 2\delta_y\left(\frac{L}{Q}\left(i+\frac{1}{2}\right)\right) + \delta_y\left(\frac{L}{Q}\left(i+\frac{3}{2}\right)\right) \\ \delta_k\left(\frac{L}{Q}\left(i-\frac{1}{2}\right)\right) - 2\delta_k\left(\frac{L}{Q}\left(i+\frac{1}{2}\right)\right) + \delta_k\left(\frac{L}{Q}\left(i+\frac{3}{2}\right)\right) \end{pmatrix} \right\|^2$$

Where, $\lfloor x \rfloor$ denotes the maximum integer equal to or less than x.

Further, the first term of the right-hand member of the evaluation function J in the formula (12) is to minimize an error between the target value and the estimated value at time "t+1". Further, the second term is to smooth the variations corresponding to the setting values expressing the tone reproduction curve TRC, and is a square sum of the quadratic differential (discrete form) of the variations corresponding to the setting values expressing the tone reproduction curve TRC. The $\delta$ to minimize the evaluation function J of the formula (12) is calculated.

$$\begin{pmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{pmatrix} \begin{pmatrix} \delta_c\left(\frac{L}{Q}\left(\left\lfloor\frac{Qc_i^{(t)}}{L}\right\rfloor+\frac{1}{2}\right)\right) \\ \delta_m\left(\frac{L}{Q}\left(\left\lfloor\frac{Qm_i^{(t)}}{L}\right\rfloor+\frac{1}{2}\right)\right) \\ \delta_y\left(\frac{L}{Q}\left(\left\lfloor\frac{Qy_i^{(t)}}{L}\right\rfloor+\frac{1}{2}\right)\right) \\ \delta_k\left(\frac{L}{Q}\left(\left\lfloor\frac{Qk_i^{(t)}}{L}\right\rfloor+\frac{1}{2}\right)\right) \end{pmatrix} \quad (13)$$

Further, in the above formula (13), the Jacobian matrix of formula (14) calculates the values of the formula (15).

$$\begin{pmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{pmatrix} \quad (14)$$

$$(c, m, y, k) = \left(\frac{L}{Q}\left(\left\lfloor\frac{Qc_i^{(t)}}{L}\right\rfloor+\frac{1}{2}\right), \frac{L}{Q}\left(\left\lfloor\frac{Qm_i^{(t)}}{L}\right\rfloor+\frac{1}{2}\right), \frac{L}{Q}\left(\left\lfloor\frac{Qy_i^{(t)}}{L}\right\rfloor+\frac{1}{2}\right), \frac{L}{Q}\left(\left\lfloor\frac{Qk_i^{(t)}}{L}\right\rfloor+\frac{1}{2}\right)\right) \quad (15)$$

-continued $(L_i^{(t)} - \overline{L}_i^{(t)}, a_i^{(t)} - \overline{a}_i^{(t)}, b_i^{(t)} - \overline{b}_i^{(t)})^T$ The above matrix represents ("$T$" denotes the transpose of the matrix) a deviation between the measure value and the target value of the CMYK data ($c_i^{(t)}$, $m_i^{(t)}$, $y_i^{(t)}$, and $k_i^{(t)}$) at time "t". When sufficiently large Q is selected (e.g., Q=16), the above matrix may be used as the estimation value of the deviation between the measure value and the target value of the CMYK data of formula (15). Further, in minimizing the evaluation function J of formula 12, the greater the number of data in the cell, the greater the weight to the center point of the cell.

Figure 11:
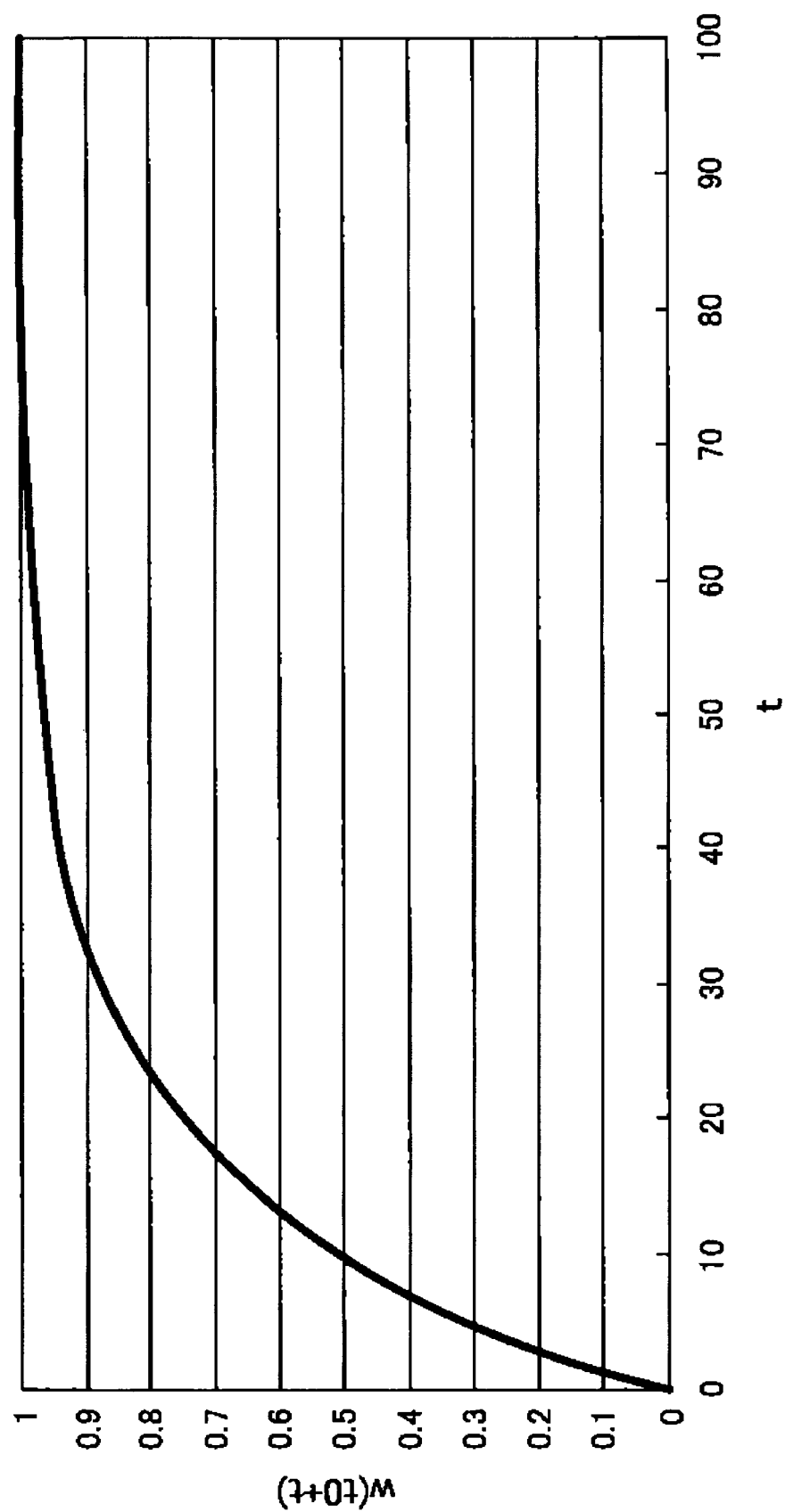
FIG. 11 is a characteristic diagram illustrating a weighting function for an image when t=100.

"$w(t-t_0)$" is a weight variable to put a weight on data in a manner such that the contribution of the latest data is the greatest. In this case a function in which w(t) monotonically increases when $t=t_0+1 \rightarrow t=t_0+T$ is selected. For example, the monotonically increasing concave function (i.e., a function in which the differential coefficient approaches 0 as t is increased, or a function which is convex upward) as illustrated in FIG. 11 may be selected (FIG. 11 illustrates a case where c=0.07, $t_0$=100).

$$w(t-t_0) = 1 - exp(-c(t-t_0)) \quad (16)$$

Where, "c" denotes a positive integer (approximately 10/T).

The minimization problem in formula (12) is expressed in a quadratic form of the $\delta_c(c)$, $\delta_m(m)$, $\delta_y(y)$, and $\delta_k(k)$. Therefore, a standard optimization calculation method may be used to solve the minimization problem. Further, the values of $\delta_c(c)$, $\delta_m(m)$, $\delta_y(y)$, and $\delta_k(k)$ other than in the following formula (17) are calculated by interpolation.

$$c = \frac{L}{Q}\left(q_c + \frac{1}{2}\right), \quad (17)$$

$$m = \frac{L}{Q}\left(q_m + \frac{1}{2}\right),$$

$$y = \frac{L}{Q}\left(q_y + \frac{1}{2}\right),$$

-continued $$k = \frac{L}{Q}\left(q_k + \frac{1}{2}\right)$$

$$q_c, q_m, q_y, q_k = 0, 1, \ldots, Q-1$$

Next, the parameter correction in step S111 of FIG. 5 is briefly described.

Based on the correction amounts determined in step S110 of FIG. 5 and the setting values of the tone reproduction curves, the setting values expressing the actual tone reproduction curve are updated as in the following formula 18.

$$\tau_c^{(t_0+T)}(x) = \tau_c^{(t_0)}(x) + \delta_c(x), \tau_m^{(t_0+T)}(x) = \tau_m^{(t_0)}(x) + \delta_m(x),$$

$$\tau_y^{(t_0+T)}(x) = \tau_y^{(t_0)}(x) + \delta_y(x), \tau_k^{(t_0+T)}(x) = \tau_k^{(t_0)}(x) + \delta_k(x)$$

$$x = 0, 1, \ldots, L-1 \quad (18)$$

After the parameters are corrected in step S111 of FIG. 5, the process goes back to step S102.

As described above, the calculation method using the TRC variation of the center point of the CNYK four-dimensional hypercube formed by dividing the density level by Q is employed. Therefore, it may become possible to achieve the following advantages.

(1) Due to the averaging of the measured data, the intra-page variance and the measurement error due to the eccentricity of the photoconductor drum may be reduced. Therefore, it may become possible to improve the control accuracy and maintain the smoothness of the tone reproduction curve and prevent the occurrence of recognizable discontinuity of the tone and recognizable color variation.

(2) It may become possible to evenly allocate the control points in the TRC control, and reduce the calculation time. Namely, regardless of the image data, for example, only 4Q (e.g., Q=16) amounts (values) for CMYK are calculated.

Herein, FIG. 12 illustrates a relationship among the intra-page variance $\Delta E(\mu + 3\sigma)$, the number of sampling colors, and the TRC estimation error (256 levels). When the intra-page variance is zero, the estimated error is approximately 1.8 regardless of the number of sampling colors. When normalized using the tone level (256), the error rate is approximately 0.7%. When N=2000, even when the intra-page variance is increased, the error rate hardly changes. However, the lesser the number of sampling colors is, the more remarkable the degradation of the estimation accuracy becomes. The ultimate target of the color stability is $\Delta E \leq 3$; therefore, when assuming that the intra-page variance is controlled to that extent, based on FIG. 12, it may become possible to maintain the TRC estimation accuracy is at approximately 0.7% when the number of sampling colors is approximately 2000.

As described above, according to an embodiment of the present invention, the main body control section 406 performs the region searching-for process to search for the color measurement adaptive region adapted to measure superimposed colors from the image indicated by the image information. Then, the colors of the color measurement adaptive region of the superimposed color toner image formed based on the image information are measured by the spectrometer 109 serving as the color measurement unit. Then, the measured colors ($L_i^{(t)}, a_i^{(t)}, b_i^{(t)}$) as the color measurement results and the densities proportional to the area ratios of the color toner images in the color measurement adaptive region are stored into the sampling color database 406g for each of the image information. Then, the average measured colors are obtained by averaging the measured colors ($L_i^{(t)}, a_i^{(t)}, b_i^{(t)}$) which are the color measurement results stored in the sampling color database 406g. Further, the averaged densities are obtained by averaging the densities stored in the sampling color database 406g. Then, based on the algorithm corresponding to plural formula models expressing the relationship between the output colors stored in advance and the setting values expressing the tone reproduction curves of the print controller 410 with respect to the toner images formable by the image forming unit, difference between the averaged measured colors and reference colors ($L_i, a_i, b_i$), the average densities, and the current setting values expressing the tone reproduction curves, the correction amounts ($\delta_c^{(t)}, \delta_m^{(t)}, \delta_y^{(t)}$, and $\delta_k^{(t)}$) corresponding to the setting values expressing the tone reproduction curves to reduce the difference based on are determined. Then, based on the determined correction amounts, the setting values expressing the tone reproduction curves are corrected to improve the color reproduction accuracy of the superimposed color toner image. As described above, the color reproduction accuracy improvement process is performed. By doing this, it may become possible to accurately reproduce the superimposed colors without forcing the user to separate the test print sheet. Further, by determining the correction amounts corresponding to the setting values expressing the tone reproduction curves by averaging the measured colors as the color measurement results and densities for each image information, even when the image information is used in which color density distribution is biased, it may become possible to maintain the smoothness of the actual tone reproduction curve and cancel (reduce) the influences of the intra-page variance and the measurement error due to the eccentricity of the photoconductor drum. Therefore, it may become possible to maintain the smoothness of the tone reproduction curve and prevent sudden variance of the tone reproduction curve.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2011-025649, filed on Feb. 9, 2011, the entire contents of which are hereby incorporated herein by reference.

The invention claimed is:

1. A control device mounted in an image forming apparatus that includes
   an image forming unit forming plural primary color toner images different from each other on a surface of a single latent image carrier or forming plural primary color toner images different from each other on corresponding plural latent image carriers,
   an image information processing unit processing image information to be input to the image forming unit based on setting values expressing tone reproduction curves which are image processing parameters forming the plural primary color toner images different from each other, and
   a transfer unit acquiring a superimposed color toner image by forming a transfer nip section by contacting a contact member to the surface of the single latent image carrier or each surface of the plural latent image carriers, and superimposing and transferring the plural primary color toner images formed on the single latent image carrier or the plural primary color toner images different from each other formed on the corresponding plural latent image carriers onto a surface of the contact member or a recording sheet held on the surface of the contact member, and executing control to drive the imaging forming unit and the transfer unit and a predetermined calculation process, the control device comprising:
- a region searching for unit configured to perform a region searching for process to search for plural color measurement adaptive regions adapted to measure colors in an image indicated by the image information;
- a color measurement unit configured to measure colors of the plural color measurement adaptive regions of the superimposed color toner image formed based on the image information;
- a storage unit configured to store measured colors which are color measurement results of measuring colors of the plural color measurement adaptive regions of the superimposed color toner image formed based on the image information and densities proportional to area ratios of primary color toner images in the superimposed color toner image in the plural color measurement adaptive regions with respect to each of image information;
- an averaging unit configured to average the measured colors and the densities stored in the storage unit;
- a correction amount determination unit configured to, after the region searching for process is performed, based on plural algorithms representing relationships between output colors previously stored with respect to each of plural primary color images formed by the image forming unit and the setting values expressing the tone reproduction curves of the image forming unit, the densities averaged by the averaging unit, difference between the measured colors averaged by the averaging unit and the reference colors, and current setting values expressing the tone reproduction curves, determine correction amounts corresponding to the setting values expressing the tone reproduction curves to minimize the difference; and
- a correction unit configured to correct the setting values expressing the tone reproduction curves based on the correction amounts.

2. An image forming apparatus comprising:

an image forming unit configured to form plural primary color toner images different from each other on a surface of a single latent image carrier or plural primary color toner images different from each other on corresponding plural latent image carriers;

an image information processing unit configured to process image information to be input to the image forming unit based on setting values expressing tone reproduction curves which are image processing parameters forming the plural primary color toner images different from each other;

a transfer unit configured to acquire a superimposed color toner image by forming a transfer nip section by contacting a contact member to the surface of the single latent image carrier or each surface of the plural latent image carriers, and superimpose and transfer the plural primary color toner images formed on the single latent image carrier or the plural primary color toner images different from each other formed on the corresponding plural latent image carriers onto a surface of the contact member or a recording sheet held on the surface of the contact member;

a control unit configured to execute control to drive the imaging forming unit and the transfer unit and a predetermined calculation process; and a color measurement unit configured to measure colors of the superimposed color toner image formed based on the image information;

wherein as the control unit, the control device according to claim 1 is used.

3. A control method device mounted in an image forming apparatus that include an image forming unit forming plural primary color toner images different from each other on a surface of a single latent image carrier or forming plural primary color toner images different from each other on corresponding plural latent image carriers, an image information processing unit processing image information to be input to the image forming unit based on setting values expressing tone reproduction curves which are image processing parameters forming the plural primary color toner images different from each other, and a transfer unit acquiring a superimposed color toner image by forming a transfer nip section by contacting a contact member to the surface of the single latent image carrier or each surface of the plural latent image carriers, and superimposing and transferring the plural primary color toner images formed on the single latent image carrier or the plural primary color toner images different from each other formed on the corresponding plural latent image carriers onto a surface of the contact member or a recording sheet held on the surface of the contact member, and executing control to drive the imaging forming unit and the transfer unit and a predetermined calculation process, the control method comprising:
- a region searching for step of performing a region searching for process to search for plural color measurement adaptive regions adapted to measure colors in an image indicated by the image information;
- a color measurement step of measuring colors of the plural color measurement adaptive regions of the superimposed color toner image formed based on the image information;
- a storing step of storing measured colors which are color measurement results of measuring colors of the plural color measurement adaptive regions of the superimposed color toner image formed based on the image information and densities proportional to area ratios of primary color toner images in the superimposed color toner image in the plural color measurement adaptive regions with respect to each of image information;
- an averaging step of averaging the measured colors and the densities stored in the storing step;
- a correction amount determining step of, after the region searching for process is performed, based on plural algorithms representing relationships between output colors previously stored with respect to each of plural primary color images formed by the image forming unit and the setting values expressing the tone reproduction curves of the image forming unit, the densities averaged in the averaging step, difference between the measured colors averaged in the averaging step and the reference colors, and current setting values expressing the tone reproduction curves, determining correction amounts corresponding to the setting values expressing the tone reproduction curves to minimize the difference; and a correcting step of correcting the setting values expressing the tone reproduction curves based on the correction amounts.

* * * * *